United States Patent [19]
Yamamuro et al.

[11] Patent Number: 6,068,697
[45] Date of Patent: May 30, 2000

[54] POLYSACCHARIDE DERIVATIVES AND HYDRAULIC COMPOSITIONS

[75] Inventors: Hotaka Yamamuro; Takeshi Ihara; Tomohito Kitsuki; Tetsuya Miyajima; Fujio Yamato; Makoto Kohama, all of Wakayama, Japan

[73] Assignee: Kao Corporation, Tokyo, Japan

[21] Appl. No.: 09/101,632

[22] PCT Filed: Nov. 26, 1997

[86] PCT No.: PCT/JP97/04316

§ 371 Date: Jul. 14, 1998

§ 102(e) Date: Jul. 14, 1998

[87] PCT Pub. No.: WO98/23647

PCT Pub. Date: Jun. 4, 1998

[30] Foreign Application Priority Data

Nov. 27, 1996 [JP] Japan ................................. 8-316166
Apr. 21, 1997 [JP] Japan ................................. 9-103038
Jun. 13, 1997 [JP] Japan ................................. 9-156793
Jun. 19, 1997 [JP] Japan ................................. 9-162289
Jun. 19, 1997 [JP] Japan ................................. 9-162637

[51] Int. Cl.[7] .......................... C08B 11/04; C08B 37/00; C04B 24/38; C04B 26/28

[52] U.S. Cl. ............... 106/804; 106/162.1; 106/163.01; 106/172.1; 106/175.1; 106/202.1; 106/203.1; 106/205.01; 106/205.2; 106/205.6; 106/205.7; 106/206.1; 106/210.1; 106/213.1; 106/215.2; 106/724; 106/725; 106/726; 106/729; 106/730; 106/802; 106/805; 106/823; 536/85; 536/91; 536/92; 536/95; 536/96; 536/102; 536/114; 536/122; 536/123.1; 536/124

[58] Field of Search ................................. 106/162.1, 724, 106/729, 725, 802, 804, 823, 726, 730, 805, 163.01, 172.1, 175.1, 202.1, 203.1, 205.01, 205.2, 205.6, 205.7, 206.1, 210.1, 213.1, 215.2; 536/123.1, 124, 85, 91, 92, 95

[56] References Cited

U.S. PATENT DOCUMENTS

| | | | |
|---|---|---|---|
| H493 | 7/1988 | Tegiacchi et al. | 106/708 |
| 5,385,607 | 1/1995 | Kiesewetter et al. | 106/197.1 |
| 5,573,589 | 11/1996 | Tanaka et al. | 106/804 |
| 5,707,445 | 1/1998 | Yamato et al. | 106/802 |

FOREIGN PATENT DOCUMENTS

| | | |
|---|---|---|
| 55-110103 | 8/1980 | Japan . |
| 56-000801 | 1/1981 | Japan . |
| 2-625441 | 2/1987 | Japan . |
| 3-12401 | 1/1991 | Japan . |
| 3-141210 | 6/1991 | Japan . |
| 3-141214 | 6/1991 | Japan . |
| 3-218316 | 9/1991 | Japan . |
| 5-085790 | 4/1993 | Japan . |
| 5-301901 | 11/1993 | Japan . |
| 7-223852 | 8/1995 | Japan . |

OTHER PUBLICATIONS

Analysis of Acrylic Polymers Using Combined Zeisel Reaction–Gas Chromatography and Infrared Spectrometry, D.G. Anderson et al, Analytical Chemistry, vol. 43, No.7, Jun. 1971, pp. 894–900.

*Primary Examiner*—Anthony Green
*Attorney, Agent, or Firm*—Birch, Stewart, Kolasch & Birch, LLP

[57] ABSTRACT

A polysaccharide derivative prepared by replacing all or part of the hydroxyl hydrogen atoms of a polysaccharide or polysaccharide derivative by (A) a hydrophobic substituent having a $C_8$–$C_{43}$ hydrocarbon chain as the partial structure and (B) an ionic hydrophilic substituent having at least one member selected from the group consisting of sulfonic, carboxyl phosphoric, and sulfate groups and salts thereof as the partial structure, wherein the average degree of replacement by the substituent (A) is 0.0001 or above but below 0.001 per constituent monosaccharide residue as determined by Zeisel's method or the diazomethane method and that by the substituent (B) is 0.01 to 2.0 per constituent monosaccharide residue as determined by colloidal titration. This polysaccharide derivative is useful as the admixture for hydraulic materials and can give stable hydraulic compositions excellent in dispersion.

25 Claims, No Drawings

POLYSACCHARIDE DERIVATIVES AND HYDRAULIC COMPOSITIONS

This application claims the benefit under 35 U.S.C. §371 of prior PCT International Application No. PCT/JP97/04316 which has an International filing date of Nov. 26, 1997 which designated the United States of America, the entire contents of which are hereby incorporated by references.

PRIOR ART

The present invention relates to a novel polysaccharide derivative, particularly one which forms an aqueous solution excellent in transparency and thickening effects even at a low concentration and reduced in the viscosity change caused by the coexistence of a metal salt or a temperature change, thus exhibiting excellent flowability, and a process for the preparation thereof. The present invention relates also to an admixture for the production of extruded articles. Specifically, it relates to an admixture which imparts suitable plasticity for extrusion to a plastic cement composition prepared by mixing a cementitious material as the major component with water to thereby enable the production of an extruded plate excellent in shape retention through the formation of smooth surfaces without causing crushing, and to a cement composition containing the admixture. The present invention relates also to an additive for gypsum-based adhesives excellent in adhesiveness and to a gypsum-based adhesive containing this additive. More specifically, it relates to an additive for gypsum-based adhesives mainly comprising cementitious materials such as hemihydrate gypsum which is effective in enhancing the adhesive bonding of a gypsum molding to a substrate and to an adhesive composition containing the additive. The present invention relates also to an additive for mortar and to a mortar composition containing the additive. More specifically, it relates to an additive for various mortars to be used in wooden buildings, concretebuildingsorthelikeas substrate, finishor the like, which additive can give a mortar composition excellent in the capability of plastering and extremely reduced in the delay of setting or development of strength. The present invention relates also to an additive for high-flowability hydraulic compositions which need not be compacted, a hydraulic composition containing this additive, and a hardened product of the composition. More specifically, it relates to an additive for hydraulic compositions which can increase the viscosity and flowability of concrete, mortar and cement paste used as civil engineering and building materials and the materials for secondary products and can protect the compositions from the segregation caused among aggregate, cement and water. The hydraulic composition containing this additive need not be compacted with a vibrator or the like and exhibits excellent hardening characteristics in placing.

BACKGROUND ART

Cellulose ethers are somewhat superior to polyacrylate thickeners such as Carbopol in the viscosity stability of an aqueous solution thereof with an inorganic or organic metal salt. However, cellulose ethers had disadvantages such that their thickening effects were poorer than those of polyacrylate thickeners at the same concentration, and that the viscosity of a hydraulic composition containing cellulose ether as the thickener or dispersant remarkably changed with the temperature.

JP-A 55-110103 and JP-A 56-801 disclose that hydrophobic nonionic cellulose derivatives prepared by partially introducing $C_{10}$–$C_{24}$ long-chain alkyl groups into nonionic water-soluble cellulose ethers exhibit relatively high thickening effects even when used in small amounts. Further, attempts to apply such alkylated cellulose derivatives to pharmaceutical preparations for external use, cosmetics and so on are disclosed in JP-A 3-12401, JP-A 3-141210, JP-A 3-141214 and JP-A 3-218316. However, these alkylated cellulose derivatives had problems that they were poor in water solubility, so that it took a long time to dissolve the derivatives homogeneously and that the viscosity of the resulting aqueous solution significantly changed with of time, though they were superior to the above cellulose ethers in thickening effects.

As described above, the cellulose ethers and alkylated cellulose derivatives according to the prior art could not satisfy all of the requirements for the ideal thickener for building materials and so on, i.e., easy dissolution, excellent thickening effect, high dispersion stabilizing effect, no damage to the flowability of building materials, low dependence of the viscosity on coexistent metal salts, surfactants or additives, temperature or pH change, excellent an timicrobial properties, and so on.

JP-A 61-256957 discloses an attempt at imparting plasticity to a mixture of a cementitious material with water by the addition of a water-soluble polymer such as methylcellulose, hydroxymethylcellulose and carboxymethylcellulose to thereby inhibit the die pressure from lowering and to thereby improve the shape retention of an extrudate. However, the use of such a polymer was not sufficiently effective in inhibiting the die pressure from lowering or in improving the shape retention, and the resulting extruded plate was poor in surface smoothness and appearance. Thus, a further improvement has been expected.

DISCLOSURE OF THE INVENTION

Under these circumstances, the inventors of the present invention have intensively studied to find that a novel polysaccharide derivative prepared by replacing the hydroxyl hydrogen atoms of a polysaccharide by a specific hydrophobic substituent and a sulfonated substituent is excellent in water solubility, that an aqueous solution of the novel polysaccharide derivative exhibits a high thickening effect even at a low concentration, and the viscosity depends little on a coexistent inorganic or organic metal salt, pH, temperature or the like, that the polysaccharide derivative exhibits also an excellent dispersing effect, and that building materials containing the derivative exhibit an excellent flowability. The present invention has been accomplished on the basis of these findings.

The inventors of the present invention have also found that when the derivative is used as an admixture in producing excluded plates, it is extremely effective in inhibiting the die pressure of a molding cylinder from lowering and in improving the shape retention and surface smoothness of extruded plates. Further, they have also found that the polysaccharide derivative exhibits an excellent thickening effect even under high-ionic-strength conditions and even when used in an extremely small amount, so that a gypsum-based adhesive containing the derivative as the additive is remarkably effective in bonding a gypsum molding such as gypsum board to a substrate. The inventors of the present invention have also found that when the derivative is used as the additive for mortar, the resulting exhibits an excellent capability of plastering mortar like the mortar of the prior art containing a water-soluble polymer, is reduced in the delay of setting, and is remarkably excellent in the development of initial strength. The inventors of the present invention have also found that by virtue of the excellent thickening effect of the polysaccharide derivative exhibited even under high-ionic-strength conditions and even when used in an extremely small amount, a hydraulic composition containing both the derivative as a thickener together with a super plasticizer can be improved in the flowability and segregation resistance and can be minimized in the suppression of hydration of hydraulic powder to exhibit a remarkably excellent initial strength.

The present invention relates to a polysaccharide derivative prepared by replacing all or part of the hydroxyl hydrogen atoms of a polysaccharide or polysaccharide derivative by (A) a hydrophobic substituent having a $C_8$–$C_{43}$ hydrocarbon chain as the partial structure and (B) an ionic hydrophilic substituent having at least one member selected from the group consisting of sulfo or sulfonic, carboxyl, phosphoric, and sulfate groups and salts thereof as the partial structure, wherein the average degree of replacement by the substituent (A) is 0.0001 or above but below 0.001 per constituent monosaccharide residue as determined by Zeisel's method or the diazomethane method and that by the substituent (B) is 0.01 to 2.0 per constituent monosaccharide residue as determined by colloidal titration.

The polysaccharide or polysaccharide derivative to be used in the present invention as the raw material is preferably selected from the group consisting of cellulose, guar gum, starch, hydroxyethylcellulose, hydroxyethyl guar gum, hydroxyethylstarch, methylcellulose, methyl guar gum, methylstarch, ethylcellulose, ethyl guar gum, ethylstarch, hydroxypropylcellulose, hydroxypropyl guar gum, hydroxypropylstarch, hydroxyethylmethylcellulose, hydroxyethylmethyl guar gum, hydroxyethylmethylstarch, hydroxypropylmethylcellulose, hydroxypropylmethyl guar gum and hydroxypropylmethylstarch.

It is preferable that the substituent (A) be a $C_{10}$–$C_{43}$ linear or branched alkyl, alkenyl or acyl group which may be hydroxylated or interrupted by oxycarbonyl (—COO— or —OCO—) or an ether linkage and the substituent (B) be an optionally hydroxylated $C_1$–$C_5$ sulfoalkyl group or a salt thereof.

Further, it is also preferable that the substituent (A) be one or more members selected from among $C_{12}$–$C_{36}$ linear and branched alkyl, alkenyl and acyl groups which may be hydroxylated or interrupted by an ether linkage and the substituent (B) be one or more members selected from among 2-sulfoethyl, 3-sulfopropyl, 3-sulfo-2-hydroxypropyl and 2-sulfo-1-(hydroxymethyl)ethyl.

Further, the present invention also provides a process for the preparation of the above polysaccharide derivative by reacting a polysaccharide or a polysaccharide derivative with both (a) a hydrophobizing agent selected from among glycidyl ethers, epoxides, halides and halohydrins each of which has a $C_{10}$–$C_{40}$ linear or branched alkyl or alkenyl group, and esters, acid halides and carboxylic anhydrides wherein the acyl group is a $C_{10}$–$C_{40}$ linear or branched, saturated or unsaturated one and (b) a sulfonating agent selected from among vinylsulfonic acid, optionally hydroxylated $C_1$–$C_5$ haloalkanesulfonic acids and salts thereof.

Furthermore, the present invention relates to a hydraulic composition comprising a hydraulic material and a polysaccharide derivative prepared by replacing all or part of the hydroxyl hydrogen atoms of a polysaccharide or polysaccharide derivative by (A) a hydrophobic substituent having a $C_8$–$C_{43}$ hydrocarbon chain as the partial structure and (B) an ionic hydrophilic substituent having at least one member selected from the group consisting of sulfonic, carboxyl, phosphoric, and sulfate groups and salts thereof as the partial structure.

A preferable example of the hydraulic composition of the present invention is one as described above wherein the substituent (A) is a $C_{10}$–$C_{43}$ linear or branched alkyl, alkenyl or acyl group which may be hydroxylated or interrupted by oxycarbony (—COO— or —OCO—) or an ether linkage, the substituent (B) is an optionally hydroxylated $C_1$–$C_5$ sulfoalkyl group or a salt thereof, the average degree of replacement by the substituent (A) is 0.0001 or above but below 0.001 per constituent monosaccharide residue as determined by Zeisel's method or the diazomethane method, and that by the substituent (B) is 0.01 to 2.0 per constituent monosaccharide residue as determined by colloidal titration.

Another preferable example of the hydraulic composition is one as described above wherein the polysaccharide derivative to be used as the raw material is an alkylated or hydroxyalkylated polysaccharide, the hydrocarbon chain of the substituent (A) is a $C_{10}$–$C_{40}$ alkyl or alkenyl group, and the hydraulic material is cement. In this composition, it is desirable that the degree of replacement by the substituent (A) is 0.001 to 1 per constituent monosaccharide residue as determined by NMR spectrometry and that by the substituent (B) is 0.01 to 2 per constituent monosaccharide residue as determined by colloidal titration. Further, it is also desirable that the substituent (A) is at least one member selected from the group consisting of alkyl glyceryl ether groups wherein the alkyl group is a $C_8$–$C_{40}$ linear or branched one, alkenyl glyceryl ether groups wherein the alkenyl group is a $C_8$–$C_{40}$ linear or branched one, and $C_8$–$C_{40}$ linear and branched alkyl, alkenyl and acyl groups which may be hydroxylated or interrupted by oxycarbonyl, and that the substituent (B) is an optionally hydroxylated $C_1$–$C_5$ sulfoalkyl group or a salt thereof. It is more desirable that the substituent (A) is an alkyl glyceryl ether group wherein the alkyl group is a $C_{12}$–$C_{36}$ linear one.

Another preferable example of the hydraulic composition is one as described above wherein the polysaccharide derivative to be used as the raw material is an alkylated or hydroxyalkylated polysaccharide, the hydrocarbon chain of the hydrophobic substituent (A) has 8 to 40 carbon atoms, the degree of replacement by the substituent (A) is 0.0001 to 1 per constituent monosaccharide residue as determined by Zeisel's method or the diazomethane method, and that by the substituent (B) is 0.001 to 2 per constituent monosaccharide residue as determined by colloidal titration.

Another preferable example of the hydraulic composition is one as described above wherein the substituent (A) is at least one member selected from the group consisting of alkyl glyceryl ether groups wherein the alkyl group is a $C_8$–$C_{40}$ linear or branched one, alkenyl glyceryl ether groups wherein the alkenyl group is a $C_8$–$C_{40}$ linear or branched one, and $C_8$–$C_{40}$ linear and branched alkyl, alkenyl and acyl groups which may be hydroxylated or interrupted by oxycarbonyl, and the substituent (B) is at least one member selected from the group consisting of sulfoalkyl, carboxyalkyl, alkyl phosphate and alkyl sulfate groups each of which has 1 to 5 carbon atoms and may be hydroxylated, and salts thereof.

Further, it is desirable that the substituent (A) is an alkyl glyceryl ether group wherein the alkyl group is a $C_{12}$–$C_{36}$ linear one. It is also desirable that the substituent (A) is an alkyl glyceryl ether group wherein the alkyl group is a $C_{12}$–$C_{36}$ linear one, and the substituent (B) is an optionally hydroxylated $C_1$–$C_5$ sulfoalkyl group.

According to the present invention, it is preferable that the polysaccharide derivative be contained in an amount of 0.0001 to 3% by weight based on the hydraulic material. The hydraulic material may be an inorganic substance which can be hardened through hydration or hemihydrate gypsum. Alternatively, the hydraulic material may be portland cement, blast-furnace slag cement or silica cement. The hydraulic composition may further contain fine aggregate or super plasticizer.

The super plasticizer is preferably a (co)polymer prepared from one or more monomers selected from the group consisting of ethylenically unsaturated carboxylic acids, adducts thereof with alkylene oxides, and derivatives thereof, or a condensate of formaldehyde with one or more compounds selected from the group consisting of methylolated and sulfonated derivatives of naphthalene, melamine, phenol, urea and aniline. It is still preferable that the super-plasticizer be a water-soluble vinyl copolymer comprising oxyalkylene units and prepared by copolymerizing a monomer represented by the following general formula (1) with at least one monomer selected from among those represented by the following general formulae (2) and (3).

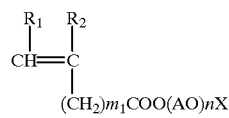

(1)

wherein $R_1$ and $R_2$ are each hydrogen, methyl; $m_1$ is a number of 0 to 2; AO is $C_2$–$C_3$ oxyalkylene; n is a number of 2 to 300; and X is hydrogen or $C_1$–$C_3$ alkyl.

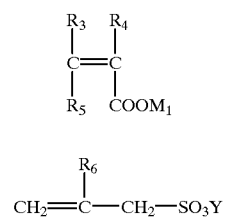

(2)

(3)

wherein $R_3$, $R_4$ and $R_5$ are each hydrogen, methyl or $(CH_2)_{m_2}COOM_2$; $R_6$ is hydrogen or methyl; $M_1$, $M_2$ and Y are each hydrogen, alkali metal, alkaline earth metal, ammonium, alkylammonium or substituted alkylammonium; and $m_2$ is a number of 0 to 2.

It is desirable that the amounts of the polysaccharide derivative and super plasticizer to be used are 0.0001 to 3% by weight and 0.1 to 5% by weight, respectively, based on the hydraulic material. It is preferable that the composition exhibit a slump flow value of 50 to 70 cm as determined by the slump test stipulated in JIS A 1101.

The hydraulic composition of the present invention is used as self-compacting concrete.

The present invention relates also to an additive for hydraulic materials which comprises the above polysaccharide derivative, a process for preparing a hydraulic composition by mixing the polysaccharide derivative with a hydraulic material and water, and the use of the polysaccharide derivative as the admixture for hydraulic materials.

The polysaccharide derivative of the present invention is usable as an admixture for the production of extruded articles. Further, it is applicable to gypsum-based adhesives, cementitious materials and mortar.

The polysaccharide derivative may be used in an amount of 0.0001 to 0.03% by weight based on the hydraulic material.

The average degree of replacement by the substituent (B) can be determined by colloidal titration and that by the substituent (A) can be determined by Zeisel's method, the diazomethane method or NMR spectrometry.

DETAILED DESCRIPTION OF THE INVENTION

Description will now be made of the embodiments according to the present invention, the embodiment ① relating to polysaccharide derivatives and the embodiments ② to ⑤ relating to hydraulic compositions.

Embodiment ①

When the novel polysaccharide derivative is prepared from a cellulose, it comprises repeating units represented by the following general formula ①-1:

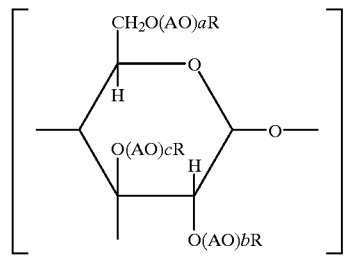

wherein R's are each independently a member selected from among (1) hydrogen, methyl, ethyl, hydroxylethyl, hydroxypropyl and so on, (2) the hydrophobic substituent (A) and (3) optionally hydroxylated sulfoalkyl groups (B), A's are each independently $C_2$–$C_4$ alkylene, and a, b and c are each independently a number of 0 to 10, with the provisos that AO's, R's, a's, b's, and c's may respectively be the same as or different from each other either in one repeating unit or among repeating units and that the average degrees of replacement by the substituents (A) and (B) are 0.0001 or above but below 0.001 and 0.01 to 2.0 respectively, per constituent monosaccharide residue, with the remainder of R's being each a member selected from among those described in the item (1).

As represented by the above general formula, both the hydrophobic substituent (A) and an optionally hydroxylated sulfoalkyl group (B) are contained as the substituent R in the polysaccharide derivative. However, it does not mean that both of the substituents (A) and (B) must always be present in one constituent monosaccharide residue, but that it will suffice in the present invention when both of the substituents are present in one polysaccharide molecule as a whole each at the above average degree of replacement. The remainder of R's are each independently hydrogen, methyl, ethyl, hydroxyethyl, hydroxypropyl or the like.

The $C_{10}$–$C_{43}$ alkyl and alkenyl groups to be introduced as the hydrophobic substituent (A) include linear alkyl groups such as decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, triacontyl, hentriacontyl, dotriacontyl, tritriacontyl, tetratriacontyl, pentatriacontyl, hexatriacontyl, heptatriacontyl, octatriacontyl, nonatriacontyl and tetracontyl; branched alkyl groups such as methylundecyl, methylheptadecyl, ethylhexadecyl, methyloctadecyl, propylpentadecyl, 2-hexyldecyl, 2-octyldodecyl, 2-heptylundecyl, 2-decyltetradecyl, 2-dodecylhexadecyl, 2-tetradecyloctadecyl and 2-tetradecylbehenyl; and alkenyl groups such as decenyl, undecenyl, dodecenyl, tridecenyl, tetradecenyl, pentadecenyl, hexadecenyl, heptadecenyl, octadecenyl, nonadecenyl, icosenyl, henicosenyl, docosenyl, tricosenyl, tetracosenyl, pentacosenyl, hexacosenyl, heptacosenyl, octacosenyl, nonacosenyl, triacontenyl, oleyl, linoleyl and linolenyl. Among these groups, $C_{12}$–$C_{36}$, particularly $C_{16}$–$C_{24}$, linear and branched alkyl and alkenyl groups are preferable, and such alkyl groups, particularly linear ones are still preferable in respect of stability. The hydrophobic substituent (A) includes not only these alkyl and alkenyl groups but also groups derived from the alkyl and alkenyl groups through hydroxylation, for example, 2-hydroxyalkyl, 1-hydroxymethylalkyl, 2-hydroxyalkenyl and 1-hydroxymethylalkenyl; groups derived therefrom through the introduction of an ether linkage, for example, 2-hydroxy-3-alkoxypropyl, 2-alkoxy-3-hydroxypropyl, 2-hydroxy-3-alkenyloxypropyl and 2-alkenyloxy-3-hydroxypropyl; groups derived therefrom by the replacement by an oxo group at the position 1, for example, 1-oxoalkyl and 1-oxoalkenyl groups (i.e., acyl groups); and groups derived therefrom through the introduction of oxycarbonyl. Among these groups, optionally hydroxylated alkyl, alkenyl, alkoxypropyl, alkenyloxypropyl and acyl groups are preferable, with 2-hydroxyalkyl and alkoxyhydroxypropyl being particularly preferable from the standpoints of stability and easiness of preparation.

The hydrophobic substituent (A) may be replaced for either the hydrogen atom of a hydroxyl group directly bonded to a polysaccharide molecule or the hydrogen atom of the hydroxy group of a hydroxylethyl or hydroxylpropyl group bonded to the molecule. The degree of replacement by the hydrophobic substituent (A) may suitably be selected within the range of 0.0001 to 0.001 per constituent monosaccharide residue.

The optionally hydroxylated sulfoalkyl group (B) includes 2-sulfoethyl, 3-sulfopropyl, 3-sulfo-2-hydroxypropyl, and 2-sulfo-1-(hydroxymethyl)ethyl, among which 3-sulfo-2-hydroxypropyl is preferable from the standpoints of stability and easiness of preparation. The whole or part of the substituent (B) may form a salt together with an alkali metal such as Na and K, an alkaline earth metal such as Ca and Mg, an organic cation derived from an amine or ammonium ion. The substituent (B) may also be replaced for either the hydrogen atom of a hydroxyl group directly bonded to a polysaccharide molecule or the hydrogen atom of the hydroxy group of a hydroxylethyl or hydroxylpropyl group bonded to the molecule. The degree of replacement by the substituent (B) may suitably be selected within the range of 0.01 to 2.0 per constituent monosaccharide residue in accordance with the amount of the substituent (A) introduced. It is preferable that the degree of replacement be 0.01 to 1.0, still preferably 0.02 to 0.5 per constituent monosaccharide residue.

The novel polysaccharide derivative of the present invention can be prepared by conducting the replacement of part of the hydroxyl hydrogen atoms of a polysaccharide or polysaccharide derivative by the hydrophobic group (A) (introduction of the hydrophobic substituent (A)) or the sulfonation thereof (introduction of the sulfonated substituent (B)) and thereafter conducting the sulfonation of all or part of the remaining hydroxyl hydrogen atoms or the replacement thereof by the hydrophobic group, or by conducting the replacement by the hydrophobic group and the sulfonation simultaneously.

The polysaccharide or polysaccharide derivative to be used in the present invention includes polysaccharides, such as cellulose, guar gum and starch, and polysaccharide derivatives prepared by substituting the above polysaccharides with methyl, ethyl, hydroxyethyl or hydroxypropyl group. These substituting groups may be present, in a constituent monosaccharide residue each alone or as a combination of two or more of them. Examples of such polysaccharide derivatives include hydroxyethylcellulose, hydroxyethyl guar gum, hydroxyethylstarch, methylcellulose, methyl guar gum, methylstarch, ethylcellulose, ethyl guar gum, ethylstarch, hydroxypropylcellulose, hydroxypropyl guar gum, hydroxypropylstarch, hydroxyethylmethylcellulose, hydroxyethylmethyl guar gum, hydroxyethylmethylstarch, hydroxypropylmethylcellulose, hydroxypropylmethyl guar gum and hydroxypropylmethylstarch. Among these polysaccharides and polysaccharide derivatives, cellulose, hydroxyethylcellulose, methylcellulose, ethylcellulose and hydroxypropylcellulose are preferable, hydroxyethylcellulose being particularly preferable. Although the above polysaccharide derivative can have a degree of replacement exceeding 3.0 per constituent monosaccharide residue by further replacing the hydroxyl groups of the hydroxyethyl or hydroxypropyl group to form a polyoxyethylene chain or the like. It is preferable that the degree of replacement be 0.1 to 10.0, particularly 0.5 to 5.0 per constituent monosaccharide residue. Further, it is desirable that the polysaccharide or polysaccharide derivative has a weight-average molecular weight of 10,000 to 10,000,000, more desirably 100,000 to 5,000,000, most desirably, 500,000 to 2,000,000.

"Hydrophobization" and "Sulfonation" will now be described separately. As described above, the hydrophobization may be conducted prior to the sulfonation or vice versa, or both of them may be conducted simultaneously.

(Hydrophobization)

The hydrophobization of a polysaccharide or a sulfonated polysaccharide can be conducted by dissolving or dispersing a polysaccharide or a sulfonated polysaccharide in a suitable solvent and reacting the polysaccharide or sulfonated polysaccharide with a hydrophobizing agent selected from among glycidyl ethers, epoxides, halides and halohydrins each of which has a $C_{10}$–$C_{40}$ linear or branched alkyl or alkenyl group, and esters, acid halides and carboxylic anhydrides having a $C_{10}$–$C_{40}$ linear or branched, saturated or unsaturated acyl group.

Among the above hydrophobizing agents, glycidyl ethers, epoxides, halides and acyl halides are particularly preferable, which may be used each alone or as a combination of two or more of them. Although the amount of the hydrophobizing agent to be used may suitably be selected in accordance with the desired amount of the hydrophobic substituent to be introduced into the polysaccharide or polysaccharide derivative, it is generally preferably 0.0001 to 1 equivalent, particularly preferably 0.0005 to 0.1 equivalent per constituent monosaccharide residue of the polysaccharide or polysaccharide derivative.

It is preferable that the hydrophobization be conducted in the presence of an alkali at need. Although the alkali to be used in this case is not particularly limited, it may be selected from among hydroxides, carbonates and bicarbonates of alkali metals and alkaline earth metals. Among them, it is preferable to use sodium hydroxide, potassium hydroxide, calcium hydroxide, magnesium hydroxide or the like. Good results can be attained, when the molar amount of the alkali used is 1 to 1000 times, particularly 100 to 500 times that of the hydrophobizing agent used.

The solvent usable in this reaction includes lower alcohols such as isopropyl alcohol and tert-butyl alcohol. The reaction may be conducted in a mixed solvent prepared by adding 1 to 50% by weight, preferably 2 to 30% by weight of water to such a lower alcohol for the purpose of swelling the polysaccharide or sulfonated polysaccharide to thereby enhance the reactivity of the (sulfonated) polysaccharide with the hydrophobizing agent.

It is preferable that the reaction temperature be 0 to 200° C., particularly 30 to 100° C. After the completion of the reaction, the reaction mixture may be neutralized with an acid at need. The acid usable for this purpose includes mineral acids such as sulfuric acid, hydrochloric acid and phosphoric acid and organic acids such as acetic acid. Further, the reaction mixture may be subjected to the subsequent reaction without being neutralized.

The reaction mixture obtained by the above reaction can be used as such without being neutralized in the subsequent sulfonation step. Prior to the sulfonation, the reaction mixturemaybe subjectedatneed to fractionationby filtration or the like and/or washing with hot water, hydrous isopropyl alcohol, hydrous acetone or the like to thereby remove unreacted hydrophobizing agent and/or the salts formed by neutralization. When the sulfonation has been conducted prior to the hydrophobization, the novel polysaccharide derivative of the present invention can be obtained by subjecting the above reaction mixture to neutralization and fractionation by filtration or the like, and thereafter drying the product thus recovered, the drying being optionally preceded by the washing of the product.

<Sulfonation>

The sulfonation of a polysaccharide or a hydrophobized polysaccharide can be conducted by dissolving or dispersing a polysaccharide or a hydrophobized polysaccharide in a suitable solvent and reacting the same with a sulfonating agent.

The halogen atom constituting the optionally hydroxylated $C_1$–$C_5$ haloalkanesulfonic acid to be used as the sulfonating agent includes fluorine, chlorine and bromine. Further, the salts of optionally hydroxylated $C_1$–$C_5$ haloalkanesulfonic acids include salts thereof with alkali metals suchas sodiumandpotassium, alkalineearthmetals such as calcium and magnesium, and ammonium. Preferable examples of the sulfonating agent include vinylsulfonic acid, 3-halo-2-hydroxypropanesulfonic acids and 3-halopropanesulfonic acids, which may be used each alone or as a combination of two or more of them. Although the amount of the sulfonating agent to be used may suitably be selected in accordance with the desired amount of sulfonic acid group to be introduced into the polysaccharide or polysaccharide derivative, it is generallypreferably 0.01 to 10 equivalents, particularly preferably 0.03 to 1 equivalent per constituent monosaccharide residue of the polysaccharide or the hydrophobized polysaccharide.

It is preferable that the sulfonation be conducted in the presence of an alkali at need. Although the alkali to be used in this case is not particularly limited, it may be selected from among hydroxides, carbonates and bicarbonates of alkali metals and alkaline earth metals. Among them, it is preferable to use sodium hydroxide, potassium hydroxide, calcium hydroxide, magnesium hydroxide or the like. Good results can be attained, when the molar amount of the alkali used is 1.0 to 3.0 times, particularly 1.05 to 1.5 times that of the sulfonating agent used.

The solvent usable in the sulfonation includes lower alcohols such as isopropyl alcohol and tert-butyl alcohol. The sulfonation may be conducted in a mixed solvent prepared by adding 0.1 to 100% by weight, preferably 1 to 50% by weight of water to such a lower alcohol for the purpose of enhancing the reactivity of the polysaccharide or the hydrophobized polysaccharide with the sulfonating agent.

It is preferable that the reaction temperature be 0 to 150° C., particularly 30 to 100° C. After the completion of the reaction, the reaction mixture may be neutralized with an acid at need. The acid usable for this purpose includes mineral acids such as sulfuric acid, hydrochloric acid and phosphoric acid and organic acids such as acetic acid. Further, the reaction mixture may be subjected to the subsequent reaction without being neutralized.

For hydrophobizing the polysaccharide thus sulfonated, the reaction mixture obtained by the above reaction can be used as such without being neutralized. Alternatively, the reaction mixture may be subjected prior to the hydrophobization to fractionation by filtration or the like and/or washing with hot water, hydrous isopropyl alcohol, hydrous acetone or the like to thereby remove unreacted sulfonating agent and/or the salts formed by neutralization. When the hydrophobization has been conducted prior to the sulfonation, the novel polysaccharide derivative of the present invention can be obtained by subjecting the reaction mixture to neutralization and fractionation by filtration or the like, and thereafter drying the product thus recovered, the drying being optionally preceded by the washing of the product.

The polysaccharide derivative of the present invention can favorably be used in various fields including building materials as thickener, dispersant or the like.

Embodiment ②

In a polysaccharide derivative, used as the admixture of the present invention, and prepared by replacing all or part of the hydroxyl hydrogen atoms of a polysaccharide or polysaccharide derivative by a specific hydrophobic substituent (A) and a specific ionic hydrophilic substituent (B). The hydrophobic substituent (A) is a group having as the partial structure a hydrocarbon chain having 8 to 40 carbon atoms, preferably 12 to 36 carbon atoms, still preferably 16 to 24 carbon atoms in total. Specific examples of such a group include alkyl glyceryl ether groups wherein the alkyl group is a linear or branched one having 8 to 40, preferably 12 to 36, still preferably 16 to 24 carbon atoms, alkenyl glyceryl ether groups wherein the alkenyl group is a linear or branched one having such a number of carbon atoms as described above, and $C_8$–$C_{40}$, preferably $C_{12}$–$C_{36}$, still preferably $C_{16}$–$C_{24}$ linear and branched, alkyl, alkenyl and acyl groups which may be hydroxylated or interrupted by oxycarbonyl. The term "alkyl gryceryl ether group" used in this description refers to a residue obtained by removing one hydroxyl group from an alkyl glyceryl ether. More specific examples of the hydrophobic substituent (A) include 2-hydroxy-3-alkoxypropyl, 2-alkoxy-1-(hydroxymethyl) ethyl, 2-hydroxy-3-alkenyloxypropyl and 2-alkenyloxy-1-(hydroxymethyl)ethyl. The hydrophobic substituent (A) may replace the hydroxyl hydrogen atom of a hydroxyethyl or hydroxypropyl group bonded to a polysaccharide molecule.

The ionic hydrophilic substituent (B) has as the partial structure a sulfonic, carboxyl, phosphoric or sulfate group which may form a salt. Specific examples thereof include sulfoalkyl and carboxylalkyl groups each of which has 1 to 5 carbon atoms and may be hydroxylated, and salts thereof. More specific examples thereof include 2-sulfoethyl, 3-sulfopropyl, 3-sulfo-2-hydroxypropyl and 2-sulfo-1-

(hydroxymethyl) ethyl, the whole or part of which may form salts together with alkali metals such as Na and K, alkaline earth metals such as Ca and Mg, organic cations derived from amines or the like, or ammonium ion.

The solubility of the polysaccharide derivative of the present invention in mixing water and the thickening effects thereof depend on the degrees of replacement by the hydrophobic substituent (A) and the ionic hydrophilic substituent (B).

More precisely, when the degrees of replacement are below their respective desired ranges, the resulting polysaccharide derivative will be poor in the solubility in mixing water, or the hydraulic composition containing it will be too low in viscosity to exhibit satisfactory shape retention. On the contrary, when the degrees of replacement are above their respective desired ranges, the resulting polysaccharide derivative will be poor in the solubility in mixing water, or the resulting hydraulic composition will be too viscous, which will bring about an increase in molding pressure to result in unsatisfactory surface smoothness. For such reasons, it is preferable that the degree of replacement by the hydrophobic substituent (A) be 0.001 to 1, still preferably 0.01 to 0.1 per constituent monosaccharide residue, while that by the ionic hydrophilic substituent (B) be 0.01 to 2, still preferably 0.02 to 1.5 per constituent monosaccharide residue. It is particularly preferable that the degrees of replacement by the substituents (A) and (B) be 0.01 to 0.1 and 0.1 to 0.6, respectively.

The replaced polysaccharide derivative to be used in the present invention can be prepared by hydrophobizing part of the hydroxyl hydrogen atoms of a polysaccharide or an alkylated or hydroxyalkylated derivative thereof (introduction of the hydrophobic substituent (A)) or hydrohpilizing the same through sulfonation or the like (introduction of the ionic hydrophilic substituent (B)) and thereafter hydrophilizing all or part of the remaining hydroxyl hydrogen atoms such as sulfonation or hydrophobizing the same, or by conducting the hydrophobization and the hydrophilization, such as sulfonation, simultaneously.

The polysaccharide to be used in preparing the polysaccharide derivative according to the present invention as the raw material includes cellulose; starch; rhizome polysaccharides such as konjak mannan and sticky matter obtained from sunset hibicus; sap polysaccharides such as gum arabic, tragacanth gum and karaya gum; seed polysaccharides such as locust bean gum, guar gum and tamarind gum; marine plant polysaccharides such as agar-agar, carrageenan and algin; animal polysaccharides such as chitin, chitosan, heparin and chondroitin sulfate; and microbial polysaccharides such as dextran and xanthan gum. The polysaccharide substituted with an ionic group includes those substituted with anionic groups, for example, carboxymethylcellulose, cellulose sulfate, cellulose phosphate and cellulose phosphite. The alkylated or hydroxyalkylated derivative of polysaccharide includes hydroxyethylcellulose, hydroxyethyl guar gum, hydroxyethylstarch, methylcellulose, methyl guar gum, methylstarch, ethylcellulose, ethyl guar gum, ethylstarch, hydroxypropylcellulose, hydroxypropyl guar gum, hydroxypropylstarch, hydroxyethylmethylcellulose, hydroxyethylmethyl guar gum, hydroxyethylmethylstarch, hydroxypropylmethylcellulose, hydroxypropylmethyl guar gum and hydroxypropylmethylstarch. Among these polysaccharides, it is preferable to use the cellulose such as cellulse, hydroxyethylcellulose, methylcellulose, ethylcellulose and hydroxypropylcellulose, and the derivativs thereof. The polysaccharide derivative to be used as the raw material may have one kind of substituents selected from among methyl, ethyl, hydroxyethyl, hydroxypropyl and so on, or two or more kinds of substituents selected therefrom. The degree of replacement is preferably 0.1 to 5, particularly preferably 0.5 to 3 per constituent monosaccharide residue.

When the substituent is an oxyalkylene group, the degree of replacement, i.e., the number of oxyalkylene units added is preferably 0.1 to 10, particularly preferably 0.5 to 5 per constituent monosaccharide residue. It is preferable that the polysaccharide or polysaccharide derivative to be used as the raw material has a weight-average molecular weight of 10,000 to 10,000,000, particularly 100,000 to 5,000,000.

The introduction of the substituents can be conducted by, for example, reacting a polysaccharide or a polysaccharide derivative with an alkyl or alkenyl glycidyl ether wherein the alkyl or alkenyl group has 10 to 40 carbon atoms, an epoxide, halide, halohydrin or acyl halide having a $C_{10}$–$C_{40}$ linear or branched, saturated or unsaturated alkyl group, or an ester or carboxylic anhydride wherein the acyl group has 10 to 40 carbon atoms in the presence of an alkali to introduce the hydrophobic substituent (A) and then reacting the resulting polysaccharide with vinylsulfonic acid, an optionally hydroxylated $C_1$–$C_5$ haloalkanesulfonic acid or a salt thereof in the presence of an alkali.

The cement composition for the production of extruded articles according to the present invention essentially comprises a cementitious material and the above admixture.

The cementitious material to be used in the present invention includes portland cements of normal, high-early-strength, super-high-early-strength and white types, blast-furnace slag cement, fly ash cement, and alumina cement.

The above admixture for the cement composition to be used in producing extruded articles is used in an amount of 0.1 to 7 parts by weight, preferably 1 to 5 parts by weight per 100 parts by weight of the cementitious material.

The cement composition for the production of extruded articles according to the present invention may further contain other various admixtures and/or additives. Such admixtures and additives include various fibrous reinforcements such as asbestos, glass fiber, polypropylene fiber, Vinylon fiber and aramide fiber; lightweight aggregates such as perlite and vermiculite; fillers such as blast furnace slag, fly ash, fumed silica, pulverized stone and silica sand; expanding admixture such as bentonite; surfactants such as plasticizer; retarder; and high-early-strength agent.

An extruded article can be produced by blending the above materials, mixing the obtained blend with a necessary amount of mixing water and extruding the resulting mixture into a predetermined shape through a die set on the head of a screw-type or plunger-type extruder. Mixing water is used in an amount of 15 to 85 parts by weight, preferably 15 to 60 parts by weight per 100 parts by weight of the cementitious material. The extrudate thus obtained is cut in desired lengths, and cured, if necessary, by using steam or an autoclave. Thus, a final extruded product can be obtained.

Embodiment ③

In the present invention, a polysaccharide derivative used as a thickener is prepared by replacing all or part of the hydroxyl hydrogen atoms of a polysaccharide or an alkylated or hydroxyalkylated derivative thereof by a specific hydrophobic substituent (A) and a specific ionic hydrophilic substituent (B) The hydrophobic substituent (A) is a group having as the partial structure a $C_8$–$C_{40}$ hydrocarbon chain. Specific examples of such a group include alkyl glyceryl ether groups wherein the alkyl group is a linear or branched one having 8 to 40, preferably 12 to 36, still preferably 16 to 24 carbon atoms, alkenyl glyceryl ether groups wherein the alkenyl group is a linear or branched one having such a number of carbon atoms as described above, and $C_8$–$C_{40}$, preferably $C_{12}$–$C_{36}$, still preferably $C_{16}$–$C_{24}$ linear and branched alkyl, alkenyl and acyl groups which may be hydroxylated or interrupted by oxycarbonyl. The alkyl glyceryl ether groups, long-chain alkyl groups and 2-hydroxylated long-chain alkyl groups are preferable from the standpoint of easiness of preparation, with the alkyl glyceryl ether groups being particularly preferable. The term "alkyl glyceryl ether group" used in this description refers to a residue obtained by removing one hydroxyl group from an alkyl glyceryl ether. More specific examples of the alkyl glyceryl ether group include 2-hydroxy-3-alkoxypropyl, 2-alkoxy-1-(hydroxymethyl)ethyl, 2-hydroxy-3-alkenyloxypropyl and 2-alkenyloxy-1-(hydroxymethyl) ethyl. The hydrophobic substituent (A) may replace the hydrogen atom of a hydroxyethyl or hydroxypropyl group bonded to a polysaccharide molecule.

The ionic hydrophilic substituent (B) has as the partial structure at least one member selected from the group consisting of sulfonic, carboxyl, phosphoric and sulfate groups which may form salts. Specific examples thereof include sulfoalkyl, carboxylakyl, alkyl phosphate and alkyl sulfate groups each of which has 1 to 5 carbon atoms and may be hydroxylated, and salts thereof. Preferable examples thereof include optionally hydroxylated $C_1$–$C_5$ sulfoalkyl groups. More specific examples thereof include 2-sulfoethyl, 3-sulfopropyl, 3-sulfo-2-hydroxypropyl and 2-sulfo-1-(hydroxymethyl)ethyl, the whole or part of which may form salts together with alkali metals such as Na or K, alkaline earth metals such as Ca or Mg, organic cations derived from amines or the like, or ammonium ion.

The solubility of the polysaccharide derivative of the present invention in mixing water and the thickening effects thereof depend on the degrees of replacement by the hydrophobic substituent (A) and the ionic hydrophilic substituent (B). Precisely, the polysaccharide derivative according to the present invention can exhibit a suitable solubility in mixing water and satisfactory thickening effects and thus imparts excellent adhesiveness to gypsum-based adhesives, when the degrees of replacement by the substituents (A) and (B) lie within their respective preferable ranges. For these reasons, it is preferable that the degree of replacement by the hydrophobic substituent (A) be 0.0001 to 1, still preferably 0.0005 to 0.01 per constituent monosaccharide residue. Further, it is preferable that the degree of replacement by the ionic polar substituent (B) be 0.001 to 2, still preferably 0.01 to 1 per constituent monosaccharide residue. It is particularly preferable that the degrees of replacement by the substituents (A) and (B) be 0.0007 to 0.005 and 0.02 to 0.15 respectively.

The polysaccharide to be used in the present invention as the raw material may be selected from among those described in the embodiment ②.

The replaced polysaccharide derivative to be used in the present invention can be prepared by hydrophobizing part of the hydroxyl hydrogen atoms of a polysaccharide or an alkylated or hydroxyalkylated derivative thereof (introduction of the hydrophobic substituent (A)) or hydrophilizing the same (introduction of the ionic hydrophilic substituent (B)) and thereafter hydrophobizing or hydrophilizing all or part of the remaining hydroxyl hydrogen atoms, or by conducting the hydrophobization and the hydrophilization simultaneously.

The introduction of the substituents can be conducted by, for example, reacting a polysaccharide or a polysaccharide derivative with an alkyl or alkenyl glyceidyl ether wherein the alkyl or alkenyl group has 8 to 40 carbon atoms, an epoxide, halide, halohydrin or acyl halide having a $C_8$–$C_{40}$ linear or branched, saturated or unsaturated alkyl group, or an ester or carboxylic anhydride wherein the acyl group has 8 to 40 carbon atoms in the presence of an alkali to introduce the hydrophobic substituent (A) and thereafter reacting the obtained polysaccharide derivative with vinylsulfonic acid, or a haloalkanesulfonic or halocarboxylic acid or a halophosphate or halosulfate ester which has 1 to 5 carbon atoms and may be hydroxylated, or a salt thereof in the presence of an alkali.

The cementitious material to be used in preparing the gypsum-based adhesive composition of the present invention [i.e., the cementitious material to which the additive of the present invention containing the above polysaccharide derivative is added] is an inorganic substance which can be hardened when mixed with water. Such an inorganic substance is typically hemihydrate gypsum (calcined gypsum), though the substance is not limited to it. Here the hemihydrate gypsum refers to ones generally produced by calcining natural gypsum, phospho-gypsum, titano-gypsum or fuel gas gypsum at 110 to 120° C.

The amount of the additive for gypsum-based adhesives to be added to a cementitious material may suitably be selected in accordance with the desired extents of thickening and adhesiveness. For example, it is preferable that the additive be used in an amount of 0.0001 to 0.03% by weight in terms of the polysaccharide derivative based on the cementitious material. Further, it is still preferable from the standpoint of the balance between adhesiveness and cost that the additive be used in an amount of 0.0005 to 0.01% by weight in terms of the polysaccharide derivative based thereon.

The addition of the additive to a cementitious material can be conducted in a state of any of aqueous solution and powder, and the addition may be conducted prior to the mixing of a gypsum-based adhesive, i.e., by dry blending with a cementitious material or dissolution in mixing water, or during the mixing of a gypsum-based adhesive, i.e., simultaneously with the addition of water to a cementitious material or between the completion of the addition of water and the completion of mixing of a gypsum-based adhesive. Alternatively, the additive may be added to a gypsum-based adhesive which has already been mixed. Further, the mode of addition may be any of the addition of the whole at once and the addition thereof in several portions.

The adhesive composition according to the present invention may further contain other various admixtures and/or additives. Such admixtures and additives include various fibrous reinforcements such as asbestos, glass fiber, polypropylene fiber, Vinylon fiber and aramide fiber, lightweight aggregates such as perlite and vermiculite, fillers such as blast furnace slag, fly ash, fumed silica, pulverized stone and silica sand, expanding admixture such as bentonite, surfactants such as plasticizer, retarder, and high-early-strength agent.

Embodiment ④

In the present invention, the polysaccharide derivative used as a thickener is described in the embodiment ③. The polysaccharide derivative exhibits a suitable solubility in mixing water and satisfactory thickening effects and therefore imparts excellent capability of plastering to mortar. With respect to the polysaccharide derivative to be used in this embodiment, it is therefore preferable that the degree of replacement by the hydrophobic substituent (A) be 0.0001 to 1, still preferably 0.0005 to 0.01 per constituent monosaccharide residue, and that by the ionic polar substituent (B) be 0.001 to 2, still preferably 0.01 to 1 per constituent monosaccharide residue. It is particularly preferable that the degrees of replacement by the substituents (A) and (B) be 0.0007 to 0.005 and 0.02 to 0.15 respectively.

The additive for mortar according to the present invention comprises the above polysaccharide derivative. The cementitious material to which the additive is added is an inorganic substance which can be hardened when mixed with water. Typical examples of such an inorganic substance include portland cement, blast-furnace slag cement and silica cement, though the substance is not limited to them.

The amount of the additive for mortar to be added to a cementitious material may suitably be selected in accordance with the desired extents of thickening and capability of plastering. For example, it is preferable that the additive be used in an amount of 0.0001 to 0.03% by weight in terms of the polysaccharide derivative based on the cementitious material. Further, it is still preferable in the balance between workability and cost that the amount be 0.0005 to 0.01% by weight in terms of the polysaccharide derivative based thereon.

The addition of the additive to a cementitious material can be conducted in a state of any of aqueous solution and powder, and the addition may be conducted either prior to the mixing of mortar, i.e., by dry blending with a cementitious material and fine aggregate or dissolution in mixing water, or during the mixing of mortar, i.e., simultaneously with the addition of water to a cementitious material or between the completion of the addition of water and the completion of mixing of mortar. Alternatively, the additive may be added to mortar which has already been mixed. Further, the additive may be added either at once or in several portions.

The mortar composition according to the present invention may further contain other various admixtures and/or additives. Such admixtures and additives include various fibrous reinforcements such as asbestos, glass fiber, polypropylene fiber, vinylon fiber and aramide fiber, lightweight aggregates such as perlite and vermiculite, fillers such as blast furnace slag, fly ash, fumed silica, pulverized stone and silica sand, expanding admixture such as bentonite, surfactants such as plasticizer, retarder, and high-early-strength agent.

Embodiment ⑤

In the present invention, the polysaccharide derivative used as a thickener is described in the embodiment ③. The polysaccharide derivative exhibits a suitable solubility in mixing water and satisfactory thickening effects and thus imparts excellent segregation resistance and flowability to a hydraulic composition. With respect to the polysaccharide derivative to be used in the present Invention, it is therefore preferable that the degree of replacement by the hydrophobic substituent (A) be 0.0001 to 1, still preferably 0.0005 to 0.01 per constituent monosaccharide residue, and that by the ionic polar substituent (B) be 0.001 to 2, still preferably 0.01 to 1 per constituent monosaccharide residue. It is particularly preferable that the degrees of replacement by the substituents (A) and (B) be 0.0007 to 0.005 and 0.02 to 0.15 respectively.

The amount of the polysaccharide derivative to be added may suitably be selected in accordance with the desired extent of thickening. For example, it is suitable to use it in an amount of 0.0001 to 3% by weight, preferably 0.001 to 0.5% by weight, still preferably 0.01 to 0.1% by weight based on the hydraulic powder used in preparing the hydraulic composition.

The term "super plasticizer" used in this description refers to a chemical admixture for concrete having a water-reducing ratio of 18% or above as determined by the method stipulated in JIS A 6204, and such a chemical admixture includes condensates of formaldehyde with one or more selected from methylolated and sulfonated derivatives of naphthalene, melamine, phenol, urea and aniline. Particular examples thereof include condensates of formaldehyde with metal salts of naphthalenesulfonic acid [such as "Mighty 150", a product of Kao Corporation], condensates of formaldehyde with metal salts of melaminesulfonic acid [such as "Mighty 150-V2", a product of Kao Corporation], condensates of formaldehyde with phenolsulfonic acid [such as compounds described in JP 1097647], and co-condensates of formaldehyde with phenol and sulfanilic acid [compounds described in JP-A 1-113419]. Other examples of the chemical admixture include polymers and copolymers prepared from one or more monomers selected from the group consisting of ethylenically unsaturated carboxylic acids, adducts thereof with alkylene oxides, and derivative thereof [such as compounds described in JP-B 2-7901, JP-A 3-75252, JP-B 2-8983 and so on].

Further, it is particularly preferable that the super plasticizer be a water-soluble vinyl copolymer comprising oxyalkylene units [such as "Mighty 3000", a product of Kao Corporation]. Such superplasticizers are disclosed in, e.g., JP-A 7-223852.

Copolymers prepared by copolymerizing a monomer represented by the above general formula (1) with one or more monomers selected from among those represented by the above general formulae (2) and (3) are favorably used in the present Invention. Examples of the monomer represented by the general formula (1) include esters of acrylic acid, methacrylic acid and dehydrogenated (oxidized) fatty acids with polyalkylene glycols each blocked with an alkyl group at one terminal, for example, methoxypolyethylene glycol, methoxypolyethylenepolypropylene glycol, ethoxypolyethylene glycol, ethoxypolyethylenepolypropylene glycol, propoxypolyethylene glycol and propoxypolyethylenepolypropylene glycol; and adducts of acrylic acid, methacrylic acid and dehydrogenated (oxidized) fatty acids with ethylene oxide and propylene oxide. Further, the polyalkylene glycol may be composed only of ethylene oxide units or propylene oxide units, or of both ethylene oxide units and propylene oxide units, whichmaybearrangedatrandom, inblockoralternately. It is particularly preferable for the purposes of shortening the delay of hardening, imparting high flowability and high compactability, and inhibiting segregation more effectively that the polyalkylene glycol be composed of 110 to 300 repeating units like in the case described in JP-A 7-223852.

Examples of the compound represented by the general formula (2) include unsaturated monocarboxylic monomers such as acrylic acid, methacrylic acid, crotonic acid and salts of these acids with alkali metals, alkaline earth metals, ammonium, amines and substituted amines, and unsaturated dicarboxylic monomers such as maleic anhydride, maleic acid, itaconic anhydride, itaconic acid, citraconic anhydride, citraconic acid, fumaric acid and salts of these acids with alkali metals, alkaline earth metals, ammonium, amines and substituted amines.

The compound represented by the general formula (3) includes allylsulfonic acid, methallylsulfonic acid, and salts of these acids with alkali metals, alkaline earthmetals, ammonium, amines and substituted amines.

Although the amount of the super plasticizer to be used in the present Invention may suitably be selected in accordance with the desired flowability, it is generally 0.1 to 5% by weight, preferably 0.5 to 3% by weight based on the hydraulic powder.

The additive of the present Invention embodiment comprising the polysaccharide derivative and a super plasticizer is added to a hydraulic powder, and such a powder is one which can be hardened through hydration, for example, cement or gypsum. Cement is preferable, which may contain blast furnace slag, fly ash, fumed silica or the like. It is to be noted that hydraulic compositions prepared by adding sand alone and a combination thereof with gravel to such a powder are generally called mortar and concrete, respectively.

As described above, a hydraulic composition having high flowability and excellent segregation resistance is called "one capable of self-compaction". Such a capability of self-compaction has a particularly important meaning for concrete containing gravel (as aggregate) which is liable to segregate easily. A concrete capable of self-compaction is called "self-compacting concrete", and the additive according to the present Invention is particularly effective for such self-compacting concrete.

The addition of the polysaccharide and super plasticizer to a hydraulic composition can be conducted in a state of any of aqueous solution and powder, and the addition may be conducted prior to the mixing of a hydraulic composition, i.e., by dry blending with a hydraulic powder or dissolution in mixing water, or during the mixing of a hydraulic composition, i.e., simultaneously with the addition of water to a hydraulic powder or between the completion of the addition of water and the completion of mixing of a hydraulic composition. Alternatively, the additive may be added to a hydraulic composition which has already been mixed. Further, the polysaccharide and super plasticizer may be added either at once or in several portions.

The additive for hydraulic compositions according to the present Invention may be used together with known dispersants. Examples of the dispersants include lignosulfonic acid and salts thereof, oxycarboxylic acids and salts thereof, and polyalkylcarboxylic anhydride and salts thereof (as disclosed in, e.g., JP-B 63-5346, JP-A 62-83344 and JP-A 1-270550). The dispersant may be premixed with the additive. Alternatively, either of the dispersant and the additive may be added to a hydraulic powder or a hydraulic composition, followed by the addition of the other. The latter addition may be preceded by mixing.

The hydraulic composition according to the present Invention may further contain one or more other admixtures and/or additives for hydraulic compositions. The admixtures and additives include sustained-release dispersant, AE water-reducing agent, plasticizer, retarder, high-early-strength agent, accelerator, foaming agent, blowing agent, anti-foaming agent, water holding agent, thickener, self-leveling agent, waterproofing agent, rust preventive, colorant, mildewproofing agent, crack inhibitor, polymer emulsions, other surfactants, other water-soluble polymers, expanding admixture and glass fiber.

[Advantages of the Invention]

① The novel polysaccharide derivative of the present invention can form an aqueous solution having high transparency and exhibit excellent thickening effects even when used in a small amount, and the viscosity imparted by the derivative little depends on coexistent salts or temperature. Therefore, the polysaccharide derivative exhibits an excellent dispersing effect. Accordingly, the novel polysaccharide derivative is widely applicable to building materials, cosmetics, toiletries and so on as thickener, gelling agent, vehicle, emulsifier, dispersant or the like.

② The use of the admixture for the production of extruded cement articles according to the present invention permits the production of high-quality extruded cement articles excellent in appearance and dimensional accuracy. Further, the admixture is effective in developing the early strength of a hydraulic composition, thus bringing about an enhancement in the productivity. The moldings produced by the use of the admixture can be used as various members of buildings and structures. Although disposable forms have recently been developed, the admixture is favorably applicable to such forms.

③ The additive for gypsum-based adhesives according to the present invention is effective in improving the adhesion of gypsum-based adhesives to substrates, which brings about an improvement in the usage of a gypsum-based adhesive and the working method to be employed in applying gypsum boards. Thus, the additive has great effects particularly on general buildings.

④ The additive for mortar according to the present invention brings about an improvement in the workability in plastering and does not cause any problematic delay of setting or any lowering in the development of strength. Accordingly, the additive brings about an improvement in the usage of mortar and the working method to be employed in applying mortar in the construction fields, solving the problem of prolongation of the term of work. Thus, the additive has great effects particularly on general buildings.

⑤ The hydraulic composition according to the present invention exhibits high flowability, high resistance to segregation of aggregate and satisfactory strengths, which brings about a great improvement in the usage of a hydraulic composition such as concrete and the working method to be employed in applying the composition. In particular, the hydraulic composition has great effects on general buildings. Further, the production of articles, such as precast concrete, from the hydraulic composition is reduced in noise and improved in the hardening properties of early stages, permitting an enhancement in the productivity and rationalization.

[Modes for Carrying Out the Invention]

The embodiments ① to ⑤ according to the present invention will now be described successively in more detail by referring to the following Examples, though the present invention is not limited by them. Polysaccharide derivatives according to the present invention were prepared in the following Examples. The degrees of replacement of the derivatives were regulated by selecting the amount of the hydrophobizing agent to be used and reaction time.

EXAMPLES

With respect to the novel polysaccharide derivatives prepared in the following Examples, the degree of replacement by the hydrophobic substituent (A) was determined by Zeisel's method (see D. G. Anderson, Anal. Chem., 43, 894 (1971)), when the substituent (A) has not any oxo groups at the position 1 (i.e., when the substituent (A) forms an ether). When the substituent (A) has an oxo group at the position 1 (i.e., when the substituent (A) forms an ester), the degree of replacement was determined by hydrolyzing a sample with an acid, neutralizing the reaction mixture, and esterifying the product thus obtained with diazomethane to determine the quantity by gas chromatography (i.e., the diazomethane method).

The degree of replacement by a sulfoalkyl group (B) was determined by colloidal titration. More specifically, it was determined by preparing a solution of a thickener having a known concentration, adding a N/200 solution of methyl glycol chitosan having a known weight (for colloidal titration, a product of Wako Pure Chemical Industries, Ltd.) to the above solution under stirring, adding several drops of a solution of Toluidine Blue indicator (for colloidal titration, a product of Wako Pure Chemical Industries, Ltd.) to the resulting mixture, subjecting the mixture thus obtained to back titration with a N/400 solution of polypotassium vinylsulfate (for colloidal titration, a product of Wako Pure Chemical Industries, Ltd.) and calculating the degree of replacement from the titer. The term "degree of replacement" used in the following Examples refers to an average number of substituents per constituent monosaccharide residue.

① Example ①-1

(1) Eighty grams of hydroxyethylcellulose (HEC-QP100M, a product of Union Carbide) having a weight-average molecular weight of about 1,500,000 and a degree of replacement by hydroxyethyl of 1.8, 640 g of 80% isopropyl alcohol and 5.5 g of a 48% aqueous solution of sodium hydroxide were charged into a 1000-ml glass-made separable reactor equipped with a stirrer, a thermometer and a condenser to prepare a slurry.

This slurry was stirred in a nitrogen atmosphere at room temperature for 30 minutes, followed by the addition of 0.84 g of stearyl glycidyl ether. The mixture thus obtained was kept at 80° C. for 8 hours to hydrophobize the hydroxyethylcellulose. After thecompletion of the reaction, the reaction mixture was neutralized with acetic acid and filtered to recover a product. This product was washed twice with 500 g of isopropyl alcohol at 50° C., then twice with 500 g of acetone, and dried under a reduce pressure at 70° C. one whole day and night to give 72.8 g of a hydrophobized hydroxyethylcellulose derivative.

(2) Twenty grams of the hydrophobized hydroxylethylcellulose derivative obtained in the step (1), 200 g of 70% isopropyl alcohol and 1.37 g of a 48% aqueous solution of sodium hydroxide were charged into a 500-ml glass-made separable reactor equipped with a stirrer, a thermometer and a condenser to prepare a slurry. This slurry was stirred in a nitrogen stream at room temperature for 30 minutes, followed by the addition of 4.09 g of sodium 3-chloro-2-hydroxypropanesulfonate and 1.7 g of a 48% aqueous solution of sodium hydroxide. The mixture thus obtained was kept at 50° C. for 3 hours to conduct sulfonation. After the completion of the reaction, the reaction mixture was neutralized with hydrochloric acid and filtered to recover a product. This product was washed once with 340 g of 70% isopropyl alcohol, then twice with 120 g of isopropyl alcohol, and dried under a reduce pressure at 70° C. one whole day and night to give 18.3 g of a hydroxyethylcellulose derivative substituted with 3-stearyloxy-2-hydroxypropyl groups and 3-sulfo-2-hydroxypropyl groups (Invention Compound ①-1).

With respect to the obtained hydroxyethylcellulose derivative, the degree of replacement by 3-stearyloxy-2-hydroxypropyl was 0.00098 and that by 3-sulfo-2-hydroxypropyl was 0.078.

Example ①-2

(1) The same procedure as that of the step (1) of Example ①-1 was repeated except that the amount of stearyl glycidyl ether was changed to 0.42 g. Thus, 68.23 g of a hydrophobized hydroxyethylcellulose derivative was obtained. (2) The hydrophobized hydroxyethylcellulose derivative prepared in the step (1) was sulfonated in the same manner as that of the step (2) of Example ①-1 except that the amounts of sodium 3-chloro-2-hydroxypropanesulfonate and a 48% aqueous solution of sodium hydroxide were changed to 2.05 g and 0.86 g, respectively. Thus, 17.64 g of a hydroxyethylcellulose derivative substituted with 3-stearyloxy-2-hydroxypropyl groups and 3-sulfo-2-hydroxypropyl groups was obtained (Invention Compound ①-2).

With respect to the obtained hydroxyethylcellulose derivative, the degree of replacement by 3-stearyloxy-2-hydroxypropyl was 0.00052 and that by 3-sulfo-2-hydroxypropyl was 0.037.

Example ①-3

Ten grams of the hydrophobized hydroxylethylcellulose derivative obtained in the step (1) of Example ①-1, 160 g of isopropyl alcohol and 8.3 g of a 25% aqueous solution of sodium vinylsulfonatewere charged into a 500-ml glass-made separable reactor equipped with a stirrer, a thermometer and a condenser to prepare a slurry. This slurry was stirred in a nitrogen stream at room temperature for 30 minutes, followed by the addition of 1.2 g of a 48% aqueous solution of sodium hydroxide. The obtained mixture was stirred in a nitrogen stream at room temperature for 60 minutes. The resulting slurry was heated to 80° C. and stirred at that temperature for 2 hours to conduct sulfonation. After the completion of the reaction, the reaction mixture was cooled, neutralized with acetic acid, washed and dried to give 8.9 g of a hydroxyethylcellulose derivative substituted with 3-stearyloxy-2-hydroxypropyl groups and sulfoethyl groups (Invention Compound ①-3).

With respect to the obtained hydroxyethylcellulose derivative, the degree of replacement by 3-stearyloxy-2-hydroxypropyl was 0.00098 and that by sulfoethyl was 0.082.

Example ①-4

Ten grams of the hydrophobized hydroxylethylcellulose derivative obtained in the step (1) of Example ①-1, 160 g of 90% isopropyl alcohol and 5.4 g of a 48% aqueous solution of sodium hydroxide were charged into a 500-ml glass-made separable reactor equipped with a stirrer, a thermometer and a condenser to prepare a slurry. This slurry was stirred in a nitrogen stream at room temperature for 30 minutes and the resulting reaction mixture was cooled with ice to 10° C. or below. Twelve grams of sodium 3-bromopropanesulfonate was charged into the reactor. The obtained mixture was stirred at 10° C. or below for 60 minutes, and thereafter heated to 80° C. and stirred at that temperature for 2 hours to conduct sulfonation. After the completion of the reaction, the reaction mixture was cooled, neutralized with acetic acid, washed and dried to give 8.9 g of a hydroxyethylcellulose derivative substituted with 3-stearyloxy-2-hydroxypropyl groups and sulfopropyl groups (Invention Compound ①-4).

With respect to the obtained hydroxyethylcellulose derivative, the degree of replacement by 3-stearyloxy-2-hydroxypropyl was 0.00098 and that by sulfopropyl was 0.077.

Example ①-5

(1) Fifty grams of hydroxyethylcellulose (HEC-QP100M, a product of Union Carbide) having a weight-average molecular weight of about 1,500,000 and a degree of replacement by hydroxylethyl of 1.8, 400 g of 88% isopropyl alcohol and 3.5 g of a 48% aqueous solution of sodium hydroxide were charged into a 1000-ml glass-made separable reactor equipped with a stirrer, a thermometer and a condenser to prepare a slurry. This slurry was stirred in a nitrogen atmosphere at room temperature for 30 minutes, followed by the addition of 0.21 g of 1,2-epoxyoctadecane. The mixture thus obtained was kept at 80° C. for 8 hours to hydrophobize the hydroxyethylcellulose. After the completion of the reaction, the reaction mixture was neutralized with acetic acid, washed and dried to give 48.8 g of a hydrophobized hydroxyethylcellulose derivative.

(2) Ten grams of the hydrophobized hydroxylethylcellulose derivative obtained in the step (1), 100 g of 70% isopropyl alcohol and 0.67 g of a 48% aqueous solution of sodium hydroxide were charged into a 500-ml glass-made separable reactor equipped with a stirrer, a thermometer and a condenser to prepare a slurry. This slurry was stirred in a nitrogen stream at room temperature for 30 minutes, followed by the addition of 2.1 g of sodium 3-chloro-2-hydroxypropane-sulfonate and 0.88 g of a 48% aqueous solution of sodium hydroxide. The mixture thus obtained was kept at 50° C. for 9 hours to conduct sulfonation. After the completion of the reaction, the reaction mixture was neutralized with acetic acid, washed and dried to give 7.2 g of ahydroxyethylcellulose derivative substituted with 2-hydroxyoctadecyl groups and 3-sulfo-2-hydroxypropyl groups (Invention Compound ①-5).

With respect to the obtained hydroxyethylcellulose derivative, the degree of replacement by 2-hydroxyoctadecyl was 0.00080 and that by 3-sulfo-2-hydroxypropyl was 0.078.

Example ①-6

(1) Fifty grams of hydroxyethylcellulose (HEC-QP100M, a product of Union Carbide) having a weight-average molecular weight of about 1,500,000 and a degree of replacement by hydroxylethyl of 1.8, 400 g of 88% isopropyl alcohol and 3.6 g of a 48% aqueous solution of sodium hydroxide were charged into a 1000-ml glass-made separable reactor equipped with a stirrer, a thermometer and a condenser to prepare a slurry. This slurry was stirred in a nitrogen atmosphere at room temperature for 30 minutes, followed by the addition of 0.4 g of 1-chlorooctadecane. The mixture thus obtained was kept at 80° C. for 8 hours to hydrophobize the hydroxyethylcellulose. After the completion of the reaction, the reaction mixture was neutralized with acetic acid, washed and dried to give 48.7 g of a hydrophobized hydroxyethylcellulose derivative.

(2) The hydrophobized hydroxyethylcellulose derivative obtained in the step (1) was sulfonated in the same manner as that of the step (2) of Example ①-5 except that the acid to be used in neutralizing the reaction mixture was changed to hydrochloric acid. Thus, 8.2 g of a hydroxyethylcellulose derivative substituted with octadecyl groups and 3-sulfo-2-hydroxypropyl groups was obtained. (Invention Compound ①-6)

With respect to the obtained hydroxyethylcellulose derivative, the degree of replacement by octadecyl was 0.00071 and that by 3-sulfo-2-hydroxypropyl was 0.080.

Example ①-7

(1) Fifty grams of hydroxyethylcellulose (HEC-QP100M, a product of Union Carbide) having a weight-average molecular weight of about 1,500,000 and a degree of replacement by hydroxylethyl of 1.8, 500 g of 70% isopropyl alcohol and 3.5 g of a 48% aqueous solution of sodium hydroxide were charged into a 1000-ml glass-made separable reactor equipped with a stirrer, a thermometer and a condenser to prepare a slurry. This slurry was stirred in a nitrogen stream at room temperature for 30 minutes, followed by the addition of 10.5 g of sodium 3-chloro-2-hydroxypropanesulfonate and 4.4 g of a 48% aqueous solution of sodium hydroxide. The mixture thus obtained was kept at 50° C. for 9 hours to conduct sulfonation. After the completion of the reaction, the reaction mixture was neutralized with acetic acid, washed and dried to give 50.0 g of a sulfonated hydroxyethylcellulose derivative.

(2) Ten grams of the sulfonated hydroxyethylcellulose derivative obtained in the step (1), 80.0 g of 88% isopropyl alcohol and 0.01 g of a 48% aqueous solution of sodium hydroxide were charged into a 500-ml glass-made separable reactor equipped with a stirrer, a thermometer and a condenser to prepare a slurry. This slurry was stirred in a nitrogen atmosphere at room temperature for 30 minutes, followed by the addition of 0.03 g of slearoyl chloride. The mixture thus obtained was kept at 80° C. for 8 hours to hydrophobize the cellulose derivative. After the completion of the reaction, the reaction mixture was neutralized with acetic acid and filtered to recover a product, and the product was washed and dried to give 8.5 g of a hydroxyethylcellulose derivative substituted with 1-oxooctadecyl groups and 3-sulfo-2-hydroxypropyl groups (Invention Compound ①-7).

With respect to the obtained hydroxyethylcellulose derivative, the degree of replacement by 1-oxooctadecyl was 0.00093 and that by 3-sulfo-2-hydroxypropyl was 0.081.

Example ①-8

(1) Fifty grams of hydroxyethylcellulose (HEC-QP4400, a product of Union Carbide) having a weight-average molecular weight of about 800,000 and a degree of replacement by hydroxylethyl of 1.8, 400 g of 80% isopropyl alcohol and 3.5 g of a 48% aqueous solution of sodium hydroxide were charged into a 1000-ml glass-made separable reactor equipped with a stirrer, a thermometer and a condenser to prepare a slurry. This slurry was stirred in a nitrogen atmosphere at room temperature for 30 minutes, followed by the addition of 0.39 g of stearyl glycidyl ether. The mixture thus obtained was kept at 80° C. for 8 hours to hydrophobize the hydroxyethyl-cellulose. After the completion of the reaction, the reaction mixture was neutralized with acetic acid and filtered to recover a product. The product was washed and dried to give 44.3 g of a hydrophobized hydroxyethylcellulose derivative.

(2) Ten grams of the hydrophobized hydroxylethylcellulose derivative obtained in the step (1), 100 g of 70% isopropyl alcohol and 0.67 g of a 48% aqueous solution of sodium hydroxide were charged into a 500-ml glass-made separable reactor equipped with a stirrer, a thermometer and a condenser to prepare a slurry. This slurry was stirred in a nitrogen stream at room temperature for 30 minutes, followed by the addition of 2.11 g of sodium 3-chloro-2-hydroxypropanesulfonate and 0.88 g of a 48% aqueous solution of sodium hydroxide. The mixture thus obtained was kept at 50° C. for 3 hours to conduct sulfonation. After the completion of the reaction, the reaction mixture was neutralized with hydrochloric acid and filtered to recover a product. The product was washed and dried to give 8.8 g of a hydroxyethylcellulose derivative substituted with 3-stearyloxy-2-hydroxypropyl groups and 3-sulfo-2-hydroxypropyl groups (Invention Compound ①-8).

With respect to the obtained hydroxyethylcellulose derivative, the degree of replacement by 3-stearyloxy-2- hydroxypropyl was 0.00081 and that by 3-sulfo-2-hydroxypropyl was 0.079.

Comparative Example ①-1

The same hydroxyethylcellulose (HEC-QP100M, a product of Union Carbide) as that used in Examples ①-1 to ①-7 was as such used (Comparative Compound ①-1).
Test Example ①-1 Test on Thickening Effect One gram of each of the Invention compounds and Comparative compound was dissolved in 200 ml of ion-exchanged water under stirring. The solutions thus prepared were each allowed to stand at room temperature one whole day and night, and thereafter examined for viscosity. Further, 1 gram of each of the Invention compounds and Comparative compound was dissolved in 200 ml of a 1.0% by weight aqueous solution of sodium chloride under stirring. The solutions thus obtained were also allowed to stand at room temperature one whole day and night, and thereafter examined for viscosity. The viscosity of each solution was determined by the use of a Brookfield viscometer (under the conditions of 12 rpm and 25° C.) The results are given in Table ①-1.

TABLE ①-1

|  | Viscosity of 0.5% aq.sol. | |
|---|---|---|
|  | water | 1% NaCl |
| Invention compd. ①-1 | 530 | 600 |
| Invention compd. ①-2 | 565 | 575 |
| Invention compd. ①-3 | 540 | 540 |
| Invention compd. ①-4 | 530 | 570 |
| Invention compd. ①-5 | 480 | 550 |
| Invention compd. ①-6 | 505 | 555 |
| Invention compd. ①-7 | 485 | 530 |
| Invention compd. ①-8 | 320 | 375 |
| Comp. Compd ①-1 | 50 | 40 |

The novel polysaccharide derivatives of the present invention give aqueous solutions having high transparency, and as understood from the results given in Table ①-1, they exhibit an excellent thickening effect and are also excellent in resistance to salts.

Example ①-9 Mortar

Mortar was prepared according to the following formula. The obtained mortar was excellent in dispersion stability of aggregate and exhibited high flowability.

| water | 350 g |
|---|---|
| cement | 700 g |
| sand | 1850 g |
| dispersant ("Mighty 3000s"), a product of Kao Corporation | 11.9 g |
| Invention compound ①-1 | 0.14 g |

In the following Synthesis Examples, polysaccharide derivatives having various degrees of replacement were prepared in a similar manner to that of Examples ①-1 to ①-8 by selecting the polysaccharide, hydrophobizing agent and hydrophilizing agent to be used as raw materials, and the amounts thereof, and/or reaction time.

② Synthesis Examples ②-1 to ②-17 and
Comparative Synthesis Examples ②-1 to ②-5

With respect to the polysaccharide derivatives prepared in the Synthesis Examples and Comparative Synthesis Examples, the degree of replacement by hydrophobic substituent was determined by NMR spectrometry, and that by sulfone group was determined by elemental analysis (for sulfur), colloidal titration or the like.

Synthesis Example ②-1: A hydroxyethylcellulose derivative (Invention admixture ②-1) substituted with stearyl glyceryl ether groups and sulfo-2-hydroxypropyl groups was prepared by reacting 50 g of hydroxyethylcellulose (HEC-QP4400, a product of Union Carbide) having a weight-average molecular weight of about 800,000 and a degree of replacement by hydroxylethyl of 1.8 with 5.4 g of steary glycidyl ether, then with 6.4 g of sodium 3-chloro-2-hydroxypropanesulfonate and 2.7 g of a 48% aqueous solution of sodium hydroxide. The yield was 7.2 g, and the degrees of replacement by steary glyceryl ether group and sulfo-2-hydroxypropyl were 0.030 and 0.15, respectively.

Synthesis Example ②-2: Another polysaccharide derivative was obtained by reacting the same polysaccharide as that used in Synthesis Example ②-1 with 10.8 g of steary glycidyl ether, 9.6 g of sodium 3-chloro-2-hydroxypropanesulfonate and 2.7 g of a 48% aqueous solution of sodium hydroxide. The degrees of replacement by steary glyceryl ether group and sulfo-2-hydroxypropyl were 0.058 and 0.20, respectively.

Synthesis Example ②-3: Another polysaccharide derivative was obtained by hydrophobizing the same hydroxyethylcellulose as that used in Synthesis Example ②-1 in the same manner as that of Synthesis Example ②-1, and sulfonating the obtained product with 18.0 g of a 25% aqueous solution of sodium vinylsulfonate and 1.2 g of a 48% aqueous solution of sodium hydroxide. The degrees of replacement by stearyl glyceryl ether group and sulfoethyl were 0.030 and 0.18, respectively.

Synthesis Example ②-4: Another polysaccharide derivative was obtained by hydrophobizing the same hydroxyethylcellulose as that used in Synthesis Example ②-2 in the same manner as that of Synthesis Example ②-2, and sulfonating the obtained product with 36.0 g of a 25% aqueous solution of sodium vinylsulfonate. The degrees of replacement by stearyl glyceryl ether group and sulfoethyl were 0.058 and 0.34, respectively.

Synthesis Example ②-5: Another polysaccharide derivative was obtained by hydrophobizing the same hydroxyethylcellulose as that used in Synthesis Example ②-1 in the same manner as that of Synthesis Example ②-1, and sulfonating the obtained product with 15.0 g of sodium 3-bromopropanesulfonate. The degrees of replacement by stearyl glyceryl ether group and sulfopropyl were 0.030 and 0.10, respectively.

Synthesis Example ②-6: Another polysaccharide derivative was obtained by reacting 50 g of the same hydroxyethylcellulose as that used in Synthesis Example ②-1 with 8.5 g of cetyl glycidyl ether and 36.0 g of a 25% aqueous solution of sodium vinylsulfonate. The degrees of replacement by cetyl glyceryl ether group and sulfoethyl were 0.060 and 0.35, respectively.

Synthesis Example ②-7: Another polysaccharide derivative was prepared from 50 g of methylcellulose having a weight-average molecular weight of about 400,000 and a degree of replacement by methyl of 1.8 (Metolose SM-800, a product of Shin-Etsu Chemical Co., Ltd.), 6.0 g of steary glycidyl ether and 7.7 g of sodium 3-chloro-2-hydroxypropanesulfonate. The degrees of replacement by steary glyceryl ether group and sulfo-2-hydroxypropyl were 0.027 and 0.15, respectively.

Synthesis Example ②-8: Another polysaccharide derivative was obtained by hydrophobizing the same cellulose as that used in Synthesis Example ②-7 in the same manner as that of Synthesis Example ②-7 and reacting the obtained product with 21.6 g of a 25% aqueous solution of sodium vinylsulfonate. The degrees of replacement by stearyl glyceryl ether group and sulfoethyl were 0.027 and 0.17, respectively.

Synthesis Example ②-9: Another polysaccharide derivative was prepared by sulfonating 16.2 g of cellulose powder (a product of Merck & Co.) with 250 g of tert-butyl alcohol and 52.0 g of a 25% aqueous solution of sodium vinylsulfonate and hydrophobizing the obtained product with 3.2 g of stearyl glycidyl ether. The degrees of replacement by stearyl glyceryl ether group and sulfoethyl were 0.025 and 0.53, respectively.

Synthesis Example ②-10: Another polysaccharide derivative was prepared in the same manner as that of Synthesis Example ②-9 except that the amount of stearyl glycidyl ether was changed to 6.4 g. The degrees of replacement by stearyl glyceryl ether group and sulfoethyl were 0.049 and 0.53, respectively.

Synthesis Example ②-11: Another polysaccharide derivative was obtained by reacting 50 g of hydroxyethylcellulose (HEC-QP100M, a product of Union Carbide) having a weight-average molecular weight of about 1,500,000 and a degree of replacement by hydroxylethyl of 1.8 with 2.2 g of 1,2-epoxyoctadecane and 12.8 g of sodium 3-chloro-2-hydroxypropanesulfonate. The degrees of replacement by 2-hydroxyoctadecyl and 3-sulfo-2-hydroxypropyl were 0.015 and 0.30, respectively.

Synthesis Example ②-12: Another polysaccharide derivative was obtained by hydrophobizing the same hydroxyethylcellulose as that used in Synthesis Example ②-11 in the same manner as that of Synthesis Example ②-11 and sulfonating the obtained product with 36.0 g of a 25% aqueous solution of sodium vinylsulfonate. The degrees of replacement by 2-hydroxyoctadecyl and 2-sulfoethyl were 0.015 and 0.32, respectively.

Synthesis Example ②-13: Another polysaccharide derivative was obtained by hydrophobizing the same hydroxyethylcellulose as that used in Synthesis Example ②-11 in the same manner as that of Synthesis Example ②-11 and sulfonating the obtained product with 30.0 g of sodium 3-bromopropanesulfonate. The degrees of replacement by 2-hydroxyoctadecyl and sulfopropyl were 0.015 and 0.20, respectively.

Synthesis Example ②-14: Another polysaccharide derivative was obtained by reacting 50 g of "HEC-QP100M" with 4.8 g of 1-chlorooctadecane and 12.8 g of sodium 3-chloro-2-hydroxypropanesulfonate. The degrees of replacement by octadecyl and 3-sulfo-2-hydroxypropyl were 0.010 and 0.31, respectively.

Synthesis Example ②-15: Another polysaccharide derivative was obtained by sulfonating 50 g of "HEC-QP100M" with 32.8 g of sodium 3-chloro-2-hydroxypropanesulfonate and hydrophobizing the obtained product with 0.44 g of stearoyl chloride. The degrees of replacement by stearoyl and 3-sulfo-2-hydroxypropyl were 0.014 and 0.20, respectively.

Synthesis Example ②-16: Another polysaccharide derivative was prepared in the same manner as that of Synthesis Example ②-1 except that the amount of stearyl glycidyl ether was changed to 0.9 g. The degrees of replacement by stearyl glycidyl ether group and sulfo-2-hydroxypropyl were 0.006 and 0.15, respectively.

Synthesis Example ②-17: Another polysaccharide derivative was prepared by hydrophobizing the same hydroxyethylcellulose as that used in Synthesis Example ②-1 in the same manner as that of Synthesis Example ②-1 except that 4.5 g of octyl glycidyl ether was used instead of 5.4 g of the stearyl glycidyl ether and sulfonating the obtained product in the same manner as that of Synthesis Example ②-3. The degrees of replacement by octyl glyceryl ether group and sulfoethyl were 0.032 and 0.05, respectively.

Comparative Synthesis Example 1

The hydroxyethylcellulose derivative substituted with stearyl glyceryl ether groups which was prepared in the step (1) of Synthesis Example ②-1 as the intermediate was used as such (Comparative admixture 1). With respect to the derivative, the degree of replacement stearyl glyceryl ether group was 0.030 as determined by NMR spectrometry and 0.008 as determined by Zeisel's method.

Comparative Synthesis Example 2

The same hydroxyethylcellulose as that used in Synthesis Examples ②-1 to ②-6 was sulfonated in the same manner as that of Synthesis Example ②-3 without hydrophobization. Thus, a sulfoethyl-substituted hydroxyethylcellulose derivative (Comparative admixture 2) was obtained, which had a degree of replacement by sulfoethyl of 0.18.

Comparative Synthesis Example 3

The same hydroxyethylcellulose as that used in Synthesis Examples ②-1 to ②-6 was as such used as Comparative admixture 3.

Comparative Synthesis Example 4

Carboxymethylcellulose (CMC2280, a product of Daicel Chemical Industries, Ltd., weight-average molecular weight: about 1,000,000, degree of carboxymethylation: 0.78) was as such used as Comparative admixture 4.

Comparative Synthesis Example 5

Polysodium acrylate ("Carbopol", a product of Goodrich) was as such used as Comparative admixture 5.

The degrees of replacement by the groups (A) described above with respect to the polysaccharide derivatives prepared in Synthesis Examples ②-1 to ②-17 are values determined by NMR spectrometry, and those determined by Zeisel's method are as follows.

| Synth. Ex. | Hydrophobic substituent Zeisel's method |
|---|---|
| 1 | 0.0092 |
| 2 | 0.0161 |
| 3 | 0.0092 |
| 4 | 0.0161 |
| 5 | 0.0092 |

-continued

| Synth. Ex. | Hydrophobic substituent Zeisel's method |
|---|---|
| 6 | 0.0184 |
| 7 | 0.0086 |
| 8 | 0.0086 |
| 9 | 0.0081 |
| 10 | 0.0150 |
| 11 | 0.0058 |
| 12 | 0.0058 |
| 13 | 0.0058 |
| 14 | 0.0035 |
| 15 | 0.0055 |
| 16 | 0.0025 |
| 17 | 0.0093 |

Example ②

(Materials used here)
1. Cementitious material
   normal portland cement: a product of Chuo Cement
2. Aggregate
   silica sand: Toyoura standard sand
3. Fibrous reinforcement
   Vinylon fiber: AB1200×6 semihard (a product of Unitika Ltd.)
4. Powdery filler
   kaolin: Kaolin (a product of Shiroishi Kogyo K.K.)
5. Admixture
   Invention admixtures ② and Comparative admixtures
(Basic formulation)

| | |
|---|---|
| normal portland cement | 100 pt. wt. |
| silica sand | 50 pt. wt. |
| Vinylon fiber | 20 pt. wt. |
| kaolin | 5 pt. wt. |
| water | 50 pt. wt. |
| admixture | 3 pt. wt. |

Cement compositions were prepared by using the above materials and the above-mentioned Invention admixtures ② or Comparative admixtures as an admixture according to the above formulation, and 10 kg of each of the cement compositions was mixed by the use of a mixer (MHS-80 mfd. byMiyazaki Iron Works, Ltd.) and extruded into a plate through a die (width: 60 mm, thickness: 8 mm) set on the head of an extrusion molding machine (FM-301 mfd. by Miyazaki Iron Works, Ltd.). The extrusion speed in the production of the plate, the molding properties and the bending strength of the plate were determined by the following methods.
(Appearance of plate)
The plates thus formed were evaluated for appearance with the naked eye according to the following criteria:
[Criteria]
○: smooth surfaces without any flaw
Δ: a few linear flaws observed on the surface
x: many linear flaws observed on the surface
(Dimensional accuracy)
Each molded plate having a width of 60 mm, a thickness of 8 mm and a length of about 2 m was examined for dimensional accuracy by measuring the width and thickness of the plate by the use of a micrometer equipped with a dial gauge (mfd. by Mitsutoyo Corp.) at intervals of 100 mm along the length, and evaluated based on the averages of the measured values according to the following criteria.
[Criteria]
○: the inaccuracies in width and thickness each less than 0.1 mm
Δ: the inaccuracies in width and thickness each 0.1 to 0.3 mm
x: the inaccuracies in width and thickness each 0.3 mm or above
(Extrusion speed)
The extrusion speed of each cement composition was evaluated by determining the time which had elapsed until the cement composition (10 kg) was extruded completely and the length of the extrudate and calculating the length of the plate extruded per minute.
(Bending strength)
The extruded plates were subjected to the bending test for mortar as stipulated in JIS-R 5201 to determine the strength after 24 hours.

The results are given in Tables ②-1 and ②-2. It can be understood that the use of the admixtures according to the present invention can give cement plates excellent in surface appearance and dimensional accuracy. Further, it can also be understood that the compositions containing the admixtures according to the present invention exhibit practical extrusion speeds and develop excellent strength in an early stage.

In the following Synthesis Examples ③, admixtures ③-1 to ③-26 were prepared in a similar manner to that of Synthesis Examples ②

Synthesis Example ③-1: A polysaccharide derivative was prepared from 50 g of HEC-QP4400, 4.0 g of stearyl glycidyl ether, 6.4 g ofsodium3-chloro-2-hydroxypropanesulfonate and 2.7 g of a 48% aqueous solution of sodium hydroxide. The degrees of replacement by stearyl glyceryl ether group and 3-sulfo-2-hydroxypropyl were 0.008 and 0.15, respectively.

Synthesis Example ③-2: Another polysaccharide derivative was prepared by hydrophobizing HEC-QP4400 in the same manner as that of Synthesis Example ③-1 except that the amount of stearyl glycidyl ether was changed to 8.0 g, and sulfonating the obtained product in the same manner as that of Synthesis Example ③-1 except that the amounts of sodium 3-chloro-2-hydroxypropanesulfonate and a 48% aqueous solution of sodium hydroxide were changed to 9.6 g and 4.0 g, respectively. The degrees of replacement by stearyl glyceryl ether group and 3-sulfo-2-hydroxypropyl were 0.014 and 0.20, respectively. Synthesis Example ③-3: Another polysaccharide derivative was obtained by hydrophobizing HEC-QP4400 in the same manner as that of Synthesis Example ③-1 and sulfonating the obtained product with 18.0 g of a 25% aqueous solution of sodium vinylsulfonate. The degrees of replacement by stearyl glyceryl ether group and sulfoethyl were 0.008 and 0.18, respectively.

Synthesis Example ③-4: Another polysaccharide derivative was obtained by hydrophobizing HEC-QP4400 in the same manner as that of Synthesis Example ③-2 and sulfonating the obtained product with 36.0 g of a 25% aqueous solution of sodium vinylsulfonate in a similar manner to that of Synthesis Example ③-3. The degrees of replacement by stearyl glyceryl ether group and sulfoethyl were 0.014 and 0.34, respectively. The degrees of replacement by stearyl glyceryl ether group and 3-sulfopropyl were 0.008 and 0.10, respectively.

Synthesis Example ③-6: Another polysaccharide derivative was obtained by hydrophobizing 50 g of HEC-QP4400 with 6.3 g of cetyl glycidyl ether and sulfonating the obtained product with 36.0 g of a25% aqueous solution of sodium vinylsulfonate. The degrees of replacement by cetyl glyceryl ether group and 2-sulfoethyl were 0.016 and 0.35, respectively.

Synthesis Example ③-7: Another polysaccharide derivative was prepared by hydrophobiling 50 g of Metolose SM-800 with 4.4 g of stearyl glycidyl ether, and sulfonating the obtained product with 7.7 g of sodium 3-chloro-2-hydroxypropane-sulfonate and 3.2 g of a 48% aqueous solution of sodium hydroxide. The degrees of replacement by stearyl glyceryl ether group and 3-sulfo-2-hydroxypropyl were 0.0075 and 0.15, respectively.

Synthesis Example ③-8: Another polysaccharide derivative was obtained by hydrophobizing Metolose SM-800 in the same manner as that of Synthesis Example ③-7 and sulfonating the obtained product with 21.6 g of a 25% aqueous solution of sodium vinylsulfonate. The degrees of replacement by stearyl glyceryl ether group and 2-sulfoethyl were 0.0075 and 0.17, respectively.

Synthesis Example ③-9: Another polysaccharide derivative was prepared by sulfonating 16.2 g of cellulose powder (a product of Merck & Co.) with 250 g of tert-butyl alcohol and 52.0 g of a 25% aqueous solution of sodium vinylsulfonate, and hydrophobizing the obtained product with 2.4 g of stearyl glycidyl ether. The degrees of replacement by stearyl glyceryl ether group and 2-sulfoethyl were 0.0070 and 0.53, respectively.

Synthesis Example ③-10: Another polysaccharide derivative was prepared in the same manner as that of Synthesis Example ③-9 except that the amount of stearyl glycidyl ether was charged to 4.8 g. The degrees of replacement by stearyl glyceryl ether group and 2-sulfoethyl were 0.0130 and 0.53, respectively.

Synthesis Example ③-11: Another polysaccharide derivative was obtained by hydrophobizing 50 g of HEC-QP100M with 1.6 g of 1,2-epoxyoctadecane and sulfonating the obtained product with 12.8 g of sodium 3-chloro-2-hydroxypropanesulfonate. The degrees of replacement by 2-hydroxyoctadecyl and 3-sulfo-2-hydroxypropyl were 0.005 and 0.30, respectively.

Synthesis Example ③-12: Another polysaccharide derivative was obtained by hydrophobizing HEC-QP100M in the same manner as that of Synthesis Example ③-11 and sulfonating the obtained product with 36.0 g of a 25% aqueous solution of sodium vinylsulfonate. The degrees of replacement by 2-hydroxyoctadecyl and 2-sulfoethyl were 0.005 and 0.32, respectively.

Synthesis Example ③-13: Another polysaccharide derivative was obtained by hydrophobizing HEC-QP100M in the same manner as that of Synthesis Example ③-11 and sulfonating the obtained product with 30.0 g of sodium 3-bromopropanesulfonate. The degrees of replacement by 2-hydroxyoctadecyl and 3-sulfopropyl were 0.005 and 0.20, respectively.

Synthesis Example ③-14: Another polysaccharide derivative was obtained by hydrophobizing 50 g of HEC-QP100M with 3.6 g of 1-chlorooctadecane and sulfonating the obtained product with 12.8 g of sodium 3-chloro-2-hydroxypropanesulfonate. The degrees of replacement by octadecyl and 3-sulfo-2-hydroxypropyl were 0.0030 and 0.31, respectively.

Synthesis Example ③-15: Another polysaccharide derivative was obtained by sulfonating 50 g of HEC-QP100M with 32.8 g of sodium 3-chloro-2-hydroxypropanesulfonate and hydrophobizing the obtained product with 0.33 g of stearoyl chloride. The degrees of replacement by stearoyl and 3-sulfo-2-hydroxypropyl were 0.0048 and 0.20, respectively.

Synthesis Example ③-16: Another polysaccharide derivative was obtained by hydrophobizing HEC-QP4400 in the same manner as that of Synthesis Example ③-1 except that the amount of stearyl glycidyl ether was changed to 0.7 g and sulfonating the obtained product in the same manner as that of Synthesis Example ③-1. The degrees of replacement by stearyl glyceryl ether group and 3-sulfo-2-hydroxypropyl were 0.0022 and 0.15, respectively.

Synthesis Example ③-17: Another polysaccharide derivative was obtained by hydrophobizing HEC-QP4400 in the same manner as that of Synthesis Example ③-1 except that 3.3 g of octyl glycidyl ether was used instead of 4.0 g of the stearyl glycidyl ether and sulfonating the obtained product in the same manner as that of Synthesis Example ③-3. The degrees of replacement by octyl glyceryl ether group and 2-sulfoethyl were 0.0081 and 0.05, respectively.

Synthesis Example ③-18: Another polysaccharide derivative was obtained by hydrophobizing 80 g of HEC-QP100M with 0.84 g of stearyl glycidyl ether and sulfonating the obtained product with 4.09 g of sodium 3-chloro-2-hydroxypropane-sulfonate and 1.7 g of a 48% aqueous solution of sodium hydroxide. The degrees of replacement by stearyl glyceryl ether group and 3-sulfo-2-hydroxypropyl were 0.00098 and 0.078, respectively.

Synthesis Example ③-19: Another polysaccharide derivative was prepared by hydrophobizing 80 g of HEC-QP100M with 0.42 g of stearyl glycidyl ether and sulfonating the obtained product with 2.05 g of sodium 3-chloro-2-hydroxypropane-sulfonate and 0.86 g of a 48% aqueous solution of sodium hydroxide. The degrees of replacement by stearyl glyceryl ether group and3-sulfo-2-hydroxypropyl were0.00052 and0.037, respectively.

Synthesis Example ③-20: Another polysaccharide derivative was prepared by hydrophobizing HEC-QP100M in the same manner as that of Synthesis Example ③-19 and sulfonating the obtained product with 8.3 g of a 25% aqueous solution of sodium vinylsulfonate. The degrees of replacement by stearyl glyceryl ether group and 2-sulfoethyl were 0.00098 and 0.082, respectively.

Synthesis Example ③-21: Another polysaccharide derivative was prepared by hydrophobizing HEC-QP100M in the same manner as that of Synthesis Example ③-19 and sulfonating the obtained product with 12.0 g of sodium 3-bromopropanesulfonate. The degrees of replacement by stearyl glyceryl ether group and 3-sulfopropyl were 0.00098 and 0.077, respectively.

Synthesis Example ③-22: Another polysaccharide derivative was prepared by hydrophobizing 50 g of HEC-QP100M with 0.21 g of 1, 2-epoxyoctadecane and sulfonating the obtained product with 2.1 g of sodium 3-chloro-2-hydroxypropanesulfonate and 0.88 g of a 48% aqueous solution of sodium hydroxide. The degrees of replacement by 2-hydroxyoctadecyl and 3-sulfo-2-hydroxypropyl were 0.00080 and 0.078, respectively.

Synthesis Example ③-23: Another polysaccharide derivative was obtained by hydrophobizing 80 g of HEC-QP100M with 0.4 g of 1-chlorooctadecane and sulfonating the obtained product with 2.1 g of sodium 3-chloro-2-hydroxypropanesulfonate and 0.88 g of a 48% aqueous solution of sodium hydroxide. The degrees of replacement by octadecyl and 3-sulfo-2-hydroxypropyl were 0.00071 and 0.080, respectively.

Synthesis Example ③-24: Another polysaccharide derivative was prepared by sulfonating 50 g of HEC-QP100M with 10.5 g of sodium 3-chloro-2-hydroxypropanesulfonate and hydrophobizing the obtained product with 0.03 g of stearoyl chloride. The degrees of replacement by 1-oxooctadecyl and 3-sulfo-2-hydroxypropyl were 0.00093 and 0.081, respectively.

Synthesis Example ③-25: Another polysaccharide derivative was prepared by hydrophobizing 50 g of HEC-QP4400 with 0.39 g of stearyl glycidyl ether and sulfonating the obtained product with 2.11 g of sodium 3-chloro-2-hydroxypropane-sulfonate and 0.88 g of a 48% aqueous solution of sodium hydroxide. The degrees of replacement by stearyl glyceryl ether group and 3-sulfo-2-hydroxypropyl were 0.00081 and 0.079, respectively.

Synthesis Example ③-26: Another polysaccharide derivative was prepared by hydrophobizing 50 g of HEC-QP4400 with 0.7 g of stearyl glycidyl ether and carboxymethylating the obtained product with 15.8 g of a 48% aqueous solution of sodium hydroxide and 24.5 g of sodium monochloroacetate. The degrees of replacement by stearyl glyceryl ether group and carboxymethyl were 0.001 (hydrophobic group content: 4.7% by weight) and 0.3, respectively.

Example ③

Adhesive compositions were prepared by mixing hemihydrate gypsum with an admixture and water by the use of a universal mixer (mfd. by Sanei Seisakusho) at 20° C. for one minute according to the formulation specified in Table ③-1, wherein the above admixtures ③-1 to ③-26 and comparative admixtures ③-1 to ③-5 were used as the admixture.

The adhesive compositions prepared above were each applied on either surface of a gypsum board (50 cm×50 cm×9 mm) uniformly and speedily. The resulting gypsum boards were stuck by pressing on a vertically standing veneer at a height of 1 m from the bottom of the veneer to determine whether the boards slipped down or not. such determination was repeated five times and the compositions were evaluated according to the following criteria on a maximum scale of 50 points.

| Not slipped down | 10 points |
|---|---|
| Slipped down by less than 10 cm | 5 points |
| Slipped down by 10 cm or more | 0 point |

It can be understood from the above results that when the additives for gypsum-based adhesives according to the present invention are used, the resulting adhesives are excellent in adhesiveness to the substrate by virtue of the thickening effect of the additives, while when comparative admixtures are used, the resulting adhesives are not satisfactory in adhesiveness to the substrate, thus being unsuitable for bonding gypsum boards or the like.

Example ④

Mortar compositions were prepared by mixing cement (a product of Chichibu Onoda Cement Corp.) with sand (standard sand occurring at Toyoura), an admixture and water by the use of a universal mixture (mfd. by Sanei Seisakusho) at 20° C. for 3 minutes according to the formulation specified in Table ④-1, wherein the above admixtures ③-1 to ③-26 and comparative admixtures ④-1 to ④-5 were used as the admixture.

The mortar compositions prepared above were each placed in a steel-made form (width: 30 cm, length: 30 cm, depth: 5 cm), followed by troweling. The resulting surfaces were qualitatively evaluated according to the following criteria:

○: satisfactory surface finish attained by virtue of excellent trowelability

Δ: somewhat unsatisfactory surface finish imparted owing to somewhat poor trowelability x: unsatisfactory surface finish imparted owing to poor trowelability Mortar specimens according to JIS-R5201 were made from the above mortar compositions and examined for compressive strength (after 3 days). Further, the mortar compositions were examined for setting time (initial one: h–min) according to ASTM—C403.

The results are given in Tables ④-2 and ④-3.

It can be understood from the above results that when the additives for mortar according to the present invention are used, excellent finish by plastering can be attained by virtue of the thickening effect of the additives without any delay of setting or hardening, while when comparative admixtures are used, the admixtures failed in attaining satisfactory trowelability and cause problems such as delay of setting, lowering in the developed strength, and so on.

Example ⑤

Hydraulic compositions (concrete) were prepared under the formulating conditions specified in Table ⑤-1.
(Materials)
water (abbrev.: W): tap water
cement (abbrev.: C): normal portland cement (sp.gr. 3.16)
fine aggregate (abbrev.: S): a 1:1 mixture of river sand occurring at the Kino River with pit sand occurring in Kimitsu (sp.gr.: 2.57, fineness modulus: 2.57)
coarse aggregate (abbrev.: G): crushed limestone occurring in Kochi (sp.gr.: 2.72, fineness modulus: 7.03, max. size 20 mm)

Table ⑤-2 shows the superplasticizers used for the above hydraulic compositions.

The superplasticizers listed in Table ⑤-2 were used for the above hydraulic compositions of Table ⑤-1 in amounts specified in Tables ⑤-3 to ⑤-5, and the above admixtures ③-1 to ③-26 were used as the thickener as shown in Tables ⑤-3 to ⑤-5. The mixing of each hydraulic composition was conducted by preliminarily dissolving the super plasticizer and the admixture (polysaccharide derivative) in mixing water at 20° C. by the use of a 100-l forced action twin-shaft mixer and mixing the resulting solution with 50 l of concrete for 2 minutes. The compositions thus obtained were examined for slump flow, segregation resistance, self compactability, strength after one day, and hardening time according to the following methods.

<Evaluation items>
1. slump flow determined according to JIS A 1101.
2. segregation resistance evaluated with the naked eye according to the following criteria.
   ○: neither aggregate nor water segregated
   Δ: aggregate and/or water segregated slightly
   x: aggregate and/or water segregated
3. self-compactability determined by mixing concrete, placing it in a cylindrical form (φ: 10 cm), hardening it, and taking the product thus formed out of the form and evaluating it for surface appearance with the naked eye according to the following criteria.
   ⊚: no void observed
   ○: no void having a size of 3 mm or above observed
   Δ: a few voids having sizes of 3 mm or above observed
   x: many voids having sizes of 3 mm or above observed.
4. strength after one day evaluated based on the compressive strength after one day as determined by the compressive strength test stipulated in JIS A 1108 according to the following criteria.
◎: 80 to 100 kgf/cm²
○: 50 to 80 kgf/cm²
Δ: 30 to 50 kgf/cm²
x: 10 to 30 kgf/cm²

5. hardening time evaluated based on the initial setting time as determined by the Proctor needle penetration test stipulated in JIS A 6204 according to the following criteria.
○: 5 to 7 hours
Δ: 7 to 9 hours
x: 9 to 11 hours The results are given in Tables ⑤-3 to ③-5. The amounts of the polysaccharide derivatives and comparative admixtures used as the thickener were 0.02% by weight based on the cement.

It can be understood from the above results that the hydraulic compositions of the present invention have high fluidity corresponding to slump flow values of as high as 60±5 cm and are excellent in segregation resistance, thus being satisfactory in self-compactability. Further, the compositions are excellent also in setting time and strength after one day, thus being satisfactory in hardening properties. On the other hand, hydraulic compositions containing comparative admixtures in an amount of 0.02% by weight based on the cement are unsatisfactory in segregation resistance and self-compactability, though they exhibit high flowability. Further, the compositions are unsatisfactory also in hardening properties.

TABLE ②-1

| | Admixture used | Poly-saccharide etc. | Substituent/ deg. of repl. | Hydrophobic group kind | deg. of repl. | Hydrophilic group kind | deg. of repl. | Appearance | dimensional accuracy | Extrusion speed (m/min) | Bending strength (kg/cm³) |
|---|---|---|---|---|---|---|---|---|---|---|---|
| Ex. ②-1 | admixture ②-1 | hydroxyethyl cellulose | HE/1.8 mw: 800.000 | stearyl glyceryl ether | 0.03 | sulfo-2-hydroxy-propyl | 0.15 | ○ | ○ | 1.5 | 49 |
| Ex. ②-2 | admixture ②-2 | hydroxyethyl cellulose | HE/1.8 mw: 800.000 | stearyl glyceryl ether | 0.058 | sulfo-2-hydroxy-propyl | 0.2 | ○ | ○ | 1.4 | 46 |
| Ex. ②-3 | admixture ②-3 | hydroxyethyl cellulose | HE/1.8 mw: 800.000 | stearyl glyceryl ether | 0.03 | sulfoethyl | 0.18 | ○ | ○ | 1.5 | 48 |
| Ex. ②-4 | admixture ②-4 | hydroxyethyl cellulose | HE/1.8 mw: 800.000 | stearyl glyceryl ether | 0.058 | sulfoethyl | 0.34 | ○ | ○ | 1.3 | 55 |
| Ex. ②-5 | admixture ②-5 | hydroxyethyl cellulose | HE/1.8 mw: 800.000 | stearyl glyceryl ether | 0.03 | sulfo-propyl | 0.1 | ○ | ○ | 1.5 | 46 |
| Ex. ②-6 | admixture ②-6 | hydroxyethyl cellulose | HE/1.8 mw: 800.000 | cethyl glyceryl ether | 0.06 | sulfoethyl | 0.35 | ○ | ○ | 1.5 | 53 |
| Ex. ②-7 | admixture ②-7 | methyl-cellulose | methyl/1.8 mw: 400.000 | stearyl glyceryl ether | 0.027 | sulfo-2-hydroxy-propyl | 0.15 | ○ | ○ | 1.3 | 55 |
| Ex. ②-8 | admixture ②-8 | methyl-cellulose | methyl/1.8 mw: 400.000 | stearyl glyceryl ether | 0.027 | sulfoethyl | 0.17 | ○ | ○ | 1.4 | 52 |
| Ex. ②-9 | admixture ②-9 | cellulose | | stearyl glyceryl ether | 0.025 | sulfoethyl | 0.53 | ○ | ○ | 1.6 | 55 |
| Ex. ②-10 | admixture ②-10 | cellulose | | stearyl glyceryl ether | 0.049 | sulfoethyl | 0.53 | ○ | ○ | 1.6 | 53 |
| Ex. ②-11 | admixture ②-11 | hydroxyethyl cellulose | HE/1.8 mw: 1,500.000 | 2-hydroxy octadecyl | 0.015 | 3-sulfo-2-hydro-propyl | 0.3 | ○ | ○ | 1.2 | 46 |
| Ex. ②-12 | admixture ②-12 | hydroxyethyl cellulose | HE/1.8 mw: 1,500.000 | 2-hydroxy octadecyl | 0.015 | 2-sulfoethyl | 0.32 | ○ | ○ | 1.2 | 47 |

TABLE ②-2

| | Admixture used | Poly-saccharide etc. | Substituent/ deg. of repl. | Hydrophobic group kind | deg. of repl. | Hydrophilic group kind | deg. of repl. | Appearance | dimensional accuracy | Extrusion speed (m/min) | Bending strength (kg/cm³) |
|---|---|---|---|---|---|---|---|---|---|---|---|
| Ex. ②-13 | admixture ②-13 | hydroxyethyl cellulose | HE/1.8 mw: 1,500.000 | 2-hydroxy octadecyl | 0.015 | 3-sulfo-propyl | 0.2 | ○ | ○ | 1.3 | 47 |
| Ex. ②-14 | admixture ②-14 | hydroxyethyl cellulose | HE/1.8 mw: 1,500.000 | octadecyl | 0.01 | 3-sulfo-2-hydroxy- | 0.31 | ○ | ○ | 1.2 | 43 |

-continued

TABLE ②-2

| Admixture used | Poly-saccharide etc. | Substituent/ deg. of repl. | Hydrophobic group kind | deg. of repl. | Hydrophilic group kind | deg. of repl. | Appearance | dimensional accuracy | Extrusion speed (m/min) | Bending strength (kg/cm³) |
|---|---|---|---|---|---|---|---|---|---|---|
| Ex. ②-15 admixture ②-15 | hydroxyethyl cellulose | HE/1.8 mw: 1,500.000 | stearoyl | 0.014 | propyl 3-sulfo-2-hydroxy-propyl | 0.2 | ○ | ○ | 1.1 | 43 |
| Ex. ②-16 admixture ②-16 | hydroxyethyl cellulose | HE/1.8 mw: 800.000 | stearyl glyceryl ether | 0.006 | sulfo-2-hydroxy-propyl | 0.15 | ○ | Δ | 1 | 39 |
| Ex. ②-17 admixture ②-17 | hydroxyethyl cellulose | HE/1.8 mw: 800.000 | octyl glyceryl ether | 0.032 | sufoethyl | 0.05 | Δ | Δ | 1 | 40 |
| Comp. ②-1 admixture ②-1 | hydroxyethyl cellulose | HE/1.8 mw: 800.000 | stearyl glyceryl ether | 0.03 | | 0 | x | x | 0.7 | 41 |
| Comp. ②-2 admixture ②-2 | hydroxyethyl cellulose | HE/1.8 mw: 800.000 | | 0 | sufoethyl | 0.18 | x | x | 0.6 | 41 |
| Comp. ②-3 admixture ②-3 | hydroxyethyl cellulose | HE/1.8 mw: 800.000 | | 0 | | 0 | x | x | 0.6 | 13 |
| Comp. ②-4 admixture ②-4 | carboxymethyl cellulose | CM/0.78 mw: 1,000.000 | | 0 | | 0.78 | x | x | 0.6 | 42 |
| Comp. ②-5 admixture ②-5 | polysodium acrylate | | | | | | x | x | 0.7 | 41 |

TABLE ③-1

| Raw material | pt. wt. |
|---|---|
| hemihydrate gypsum | 100.0 |
| admixture | 0.2 |
| water | 100.0 |

TABLE ③-2

| Polysaccharide deriv. Invention | Adhesiveness |
|---|---|
| admixture③-1 | 45 |
| admixture③-2 | 40 |
| admixture③-3 | 45 |
| admixture③-4 | 40 |
| admixture③-5 | 45 |
| admixture③-6 | 40 |
| admixture③-7 | 45 |
| admixture③-8 | 45 |
| admixture③-9 | 45 |
| admixture③-10 | 40 |
| admixture③-11 | 40 |
| admixture③-12 | 40 |
| admixture③-13 | 45 |
| admixture③-14 | 40 |
| admixture③-15 | 45 |
| admixture③-16 | 50 |

TABLE ③-3

| Polysaccharide deriv. | Adhesiveness |
|---|---|
| Invention | |
| admixture③-17 | 45 |
| admixture③-18 | 50 |
| admixture③-19 | 50 |
| admixture③-20 | 50 |
| admixture③-21 | 50 |
| admixture③-22 | 50 |
| admixture③-23 | 50 |
| admixture③-24 | 50 |
| admixture③-25 | 50 |
| admixture③-26 | 35 |
| Comp. | |
| comp. admixture③-1 | 15 |
| comp. admixture③-2 | 15 |
| comp. admixture③-3 | 15 |
| comp. admixture③-4 | 10 |
| comp. admixture③-5 | 10 |

TABLE ④-1

| Raw material | pt. wt. |
|---|---|
| cement | 1000 |
| sand | 2000 |
| admixture | 3.0 |
| water | 600 |

TABLE ④-2

| Polysaccharide deriv. Invention | surface finish | setting time (h-min) | Strength (N/mm$^2$) |
|---|---|---|---|
| admixture④-1 | ○ | 5-24 | 4.0 |
| admixture④-2 | ○ | 5-37 | 3.7 |
| admixture④-3 | ○ | 5-25 | 4.0 |
| admixture④-4 | ○ | 5-39 | 3.8 |
| admixture④-5 | ○ | 5-25 | 4.1 |
| admixture④-6 | ○ | 5-35 | 3.8 |
| admixture④-7 | ○ | 5-24 | 4.1 |
| admixture④-8 | ○ | 5-26 | 4.0 |
| admixture④-9 | ○ | 5-35 | 3.7 |
| admixture④-10 | ○ | 5-39 | 3.6 |
| admixture④-11 | ○ | 5-35 | 3.6 |
| admixture④-12 | ○ | 5-33 | 3.7 |
| admixture④-13 | ○ | 5-23 | 4.0 |
| admixture④-14 | ○ | 5-32 | 3.8 |
| admixture④-15 | ○ | 5-26 | 4.0 |
| admixture④-16 | ○ | 5-18 | 4.3 |

TABLE ④-3

| Polysaccharide deriv. | surface finish | setting time (h-min) | Strength (N/mm$^2$) |
|---|---|---|---|
| Invention | | | |
| admixture④-17 | ○ | 5-17 | 4.3 |
| admixture④-18 | ○ | 5-11 | 4.9 |
| admixture④-19 | ○ | 5-13 | 4.8 |
| admixture④-20 | ○ | 5-11 | 4.6 |
| admixture④-21 | ○ | 5-14 | 4.7 |
| admixture④-22 | ○ | 5-12 | 4.6 |
| admixture④-23 | ○ | 5-11 | 4.5 |
| admixture④-24 | ○ | 5-13 | 4.6 |
| admixture④-25 | ○ | 5-15 | 4.5 |
| admixture④-26 | ○ | 5-23 | 3.7 |
| Comp. | | | |
| comp. admixture④-1 | Δ | 7-16 | 2.1 |
| comp. admixture④-2 | Δ | 7-15 | 2.3 |
| comp. admixture④-3 | Δ | 7-11 | 2.0 |
| comp. admixture④-4 | x | 7-21 | 2.2 |
| comp. admixture④-5 | Δ | 7-15 | 2.4 |

TABLE ⑤-1

| W/C (%) | Unit quantity (kg/m$^3$) | | | | Air content (%) |
|---|---|---|---|---|---|
| | W | C | S | G | |
| 49 | 170 | 350 | 918 | 862 | 4.5 |

TABLE ⑤-2

| No. | Superplasticizer |
|---|---|
| ⑤-1 | condensate of formaldehyde with naphthalenesulfonic acid salt (trade name: "Mighty 150", a product of Kao Corporation) |
| ⑤-2 | condensate of formaldehyde with melaminesulfonic acid salt (trade name: "Mighty 150V-2", a product of Kao Corporation) |
| ⑤-3 | condensate of formaldehyde with phenolsulfonic acid salt (sample prepared according to Synthesis Example No.7 of JP 1097647) |
| ⑤-4 | co-condensate of formaldehyde with phenol and sulfanilic acid salt (sample prepared according to Example 15 of JP-A 1-113419 |
| ⑤-5 | copolymer comprising a monomer having added alkylene oxide units and a carboxylic acid monomer (sample prepared according to Referential Example 5 of JP-B 2-7901 |
| ⑤-6 | polycarboxylic acid copolymer (sample prepared according to Preparative Example 1 of JP-B 4-209737) |
| ⑤-7 | polycarboxylic acid copolymer (sample prepared according to Synthesis Example of JP-A 58-74552) |
| ⑤-8 | polyether (sample prepared according to Preparative Example 1 of JP-A 7-223852) |

TABLE ⑤-3

| Division | Superplasticizer No. | amp. (%)* | Polysaccharide deriv. | Slump flow | Segregation resistance | Self-compactability | Strength after one day | Hardenig time |
|---|---|---|---|---|---|---|---|---|
| Invention | ⑤-1 | 1.9 | admixture | 61.0 | ○ | ○ | ○ | ○ |
|  | ⑤-2 | 2.0 | ⑤-1 | 63.5 | ○ | ○ | ○ | ○ |
|  | ⑤-3 | 1.3 |  | 60.0 | ○ | ○ | ○ | ○ |
|  | ⑤-1 | 2.0 | admixture | 59.5 | ○ | ○ | ○ | ○ |
|  | ⑤-4 | 1.7 | ⑤-2 | 63.0 | ○ | ○ | ○ | ○ |
|  | ⑤-5 | 1.7 |  | 64.0 | ○ | ○ | ○ | ○ |
|  | ⑤-6 | 1.5 | admixture | 60.0 | ○ | ○ | ○ | ○ |
|  | ⑤-7 | 1.5 | ⑤-3 | 59.0 | ○ | ○ | ○ | ○ |
|  | ⑤-8 | 1.1 |  | 64.0 | ○ | ○ | ⊙ | ○ |
|  | ⑤-1 | 1.8 | admixture | 63.0 | ○ | ○ | ○ | Δ |
|  | ⑤-3 | 1.5 | ⑤-4 | 62.5 | ○ | ○ | ○ | ○ |
|  | ⑤-5 | 1.6 |  | 66.0 | ○ | ○ | ○ | ○ |
|  | ⑤-4 | 1.6 | admixture | 61.0 | ○ | ○ | ○ | ○ |
|  | ⑤-5 | 1.7 | ⑤-5 | 63.0 | ○ | ○ | ○ | ○ |
|  | ⑤-8 | 1.2 |  | 60.0 | ○ | ○ | ⊙ | ○ |
|  | ⑤-5 | 1.8 | admixture | 64.0 | ○ | ○ | ○ | ○ |
|  | ⑤-6 | 1.5 | ⑤-6 | 64.0 | ○ | ○ | ○ | ○ |
|  | ⑤-8 | 1.1 |  | 60.5 | ○ | ○ | ⊙ | ○ |
|  | ⑤-1 | 1.6 | admixture | 61.0 | ○ | ○ | ○ | ○ |
|  | ⑤-2 | 1.9 | ⑤-7 | 59.5 | ○ | ○ | ○ | ○ |
|  | ⑤-3 | 1.3 |  | 64.5 | ○ | ○ | ○ | ○ |
|  | ⑤-4 | 1.7 | admixture | 60.5 | ○ | ○ | ○ | ○ |
|  | ⑤-5 | 1.7 | ⑤-8 | 62.0 | ○ | ○ | ○ | ○ |
|  | ⑤-6 | 1.4 |  | 62.5 | ○ | ○ | ○ | ○ |
|  | ⑤-7 | 1.8 | admixture | 61.5 | ○ | ○ | ○ | Δ |
|  | ⑤-8 | 1.0 | ⑤-9 | 64.0 | ○ | ○ | ⊙ | ○ |
|  | ⑤-3 | 1.4 |  | 60.0 | ○ | ○ | ○ | ○ |
|  | ⑤-1 | 1.9 | admixture | 62.0 | ○ | ○ | ○ | Δ |
|  | ⑤-4 | 1.8 | ⑤-10 | 61.0 | ○ | ○ | ○ | ○ |
|  | ⑤-7 | 1.6 |  | 58.5 | ○ | ○ | ○ | ○ |
|  | ⑤-2 | 1.8 | admixture | 59.0 | ○ | ○ | ○ | ○ |
|  | ⑤-5 | 1.6 | ⑤-11 | 61.0 | ○ | ○ | ○ | ○ |
|  | ⑤-6 | 1.7 |  | 63.5 | ○ | ○ | ○ | ○ |

*: % by weight based on cement

TABLE ⑤-4

| Division | Superplasticizer No. | amp. (%)* | Polysaccharide deriv. | Slump flow | Segregation resistance | Self-compactability | Strength after one day | Hardenig time |
|---|---|---|---|---|---|---|---|---|
| Invention | ⑤-1 | 1.9 | admixture | 62.0 | ○ | ○ | ○ | ○ |
|  | ⑤-2 | 2.0 | ⑤-12 | 61 | ○ | ○ | ○ | ○ |
|  | ⑤-3 | 1.3 |  | 64.5 | ○ | ○ | ○ | ○ |
|  | ⑤-1 | 1.9 | admixture | 59.5 | ○ | ○ | ○ | ○ |
|  | ⑤-4 | 1.7 | ⑤-13 | 60.0 | ○ | ○ | ○ | ○ |
|  | ⑤-5 | 1.7 |  | 60.5 | ○ | ○ | ○ | ○ |
|  | ⑤-6 | 1.5 | admixture | 58.5 | ○ | ○ | ○ | ○ |
|  | ⑤-7 | 1.3 | ⑤-14 | 61.0 | ○ | ○ | ○ | ○ |
|  | ⑤-8 | 1 |  | 60.0 | ○ | ○ | ⊙ | ○ |
|  | ⑤-4 | 1.6 | admixture | 64.5 | ○ | ○ | ○ | ○ |
|  | ⑤-5 | 1.6 | ⑤-15 | 63 | ○ | ○ | ○ | ○ |
|  | ⑤-8 | 1.1 |  | 65.0 | ○ | ○ | ⊙ | ○ |
|  | ⑤-2 | 1.9 | admixture | 61.5 | ○ | ⊙ | ○ | ○ |
|  | ⑤-4 | 1.8 | ⑤-16 | 60.0 | ○ | ⊙ | ○ | ○ |
|  | ⑤-8 | 1.3 |  | 60.5 | ○ | ⊙ | ⊙ | ○ |
|  | ⑤-1 | 2 | admixture | 61.5 | ○ | ○ | ○ | ○ |
|  | ⑤-3 | 1.6 | ⑤-17 | 63.5 | ○ | ○ | ○ | ○ |
|  | ⑤-5 | 1.7 |  | 62.5 | ○ | ○ | ○ | ○ |
|  | ⑤-2 | 1.8 | admixture | 61.0 | ○ | ⊙ | ○ | ○ |
|  | ⑤-3 | 1.3 | ⑤-18 | 62 | ○ | ⊙ | ○ | ○ |
|  | ⑤-4 | 1.7 |  | 63.5 | ○ | ⊙ | ○ | ○ |
|  | ⑤-3 | 1.4 | admixture | 65 | ○ | ○ | ○ | ○ |
|  | ⑤-4 | 1.7 | ⑤-19 | 61.0 | ○ | ○ | ○ | ○ |

-continued

TABLE ⑤-4

| Division | No. | Superplasticizer amp. (%)* | Polysaccharide deriv. | Slump flow | Segregation resistance | Self-compactability | Strength after one day | Hardenig time |
|---|---|---|---|---|---|---|---|---|
| | ⑤-5 | 1.7 | | 60 | ○ | ○ | ○ | ○ |
| | ⑤-1 | 1.9 | admixture | 59.5 | ○ | ⊙ | ○ | ○ |
| | ⑤-6 | 1.5 | ⑤-20 | 61.0 | ○ | ⊙ | ○ | ○ |
| | ⑤-7 | 1.5 | | 60.5 | ○ | ⊙ | ○ | ○ |
| | ⑤-1 | 1.8 | admixture | 59.5 | ○ | ⊙ | ○ | ○ |
| | ⑤-7 | 1.5 | ⑤-21 | 60.0 | ○ | ⊙ | ○ | ○ |
| | ⑤-8 | | | 60.5 | ○ | ⊙ | ⊙ | ○ |
| | ⑤-1 | 1.9 | admixture | 60.5 | ○ | ⊙ | ○ | ○ |
| | ⑤-2 | 2.1 | ⑤-22 | 62.5 | ○ | ⊙ | ○ | ○ |
| | ⑤-3 | 1.3 | | 64 | ○ | ⊙ | ○ | ○ |

*: % by weight based on cement

TABLE ⑤-5

| Division | No. | Superplasticizer amp. (%)* | Polysaccharide deriv. | Slump flow | Segregation resistance | Self-compactability | Strength after one day | Hardenig time |
|---|---|---|---|---|---|---|---|---|
| Invention | ⑤-5 | 1.7 | admixture | 61.0 | ○ | ⊙ | ○ | ○ |
| | ⑤-6 | 1.5 | ⑤-23 | 60.5 | ○ | ⊙ | ○ | ○ |
| | ⑤-7 | 1.6 | | 63.0 | ○ | ⊙ | ⊙ | ○ |
| | ⑤-5 | 1.6 | admixture | 62.5 | ○ | ⊙ | ⊙ | ○ |
| | ⑤-6 | 1.4 | ⑤-24 | 62.0 | ○ | ⊙ | ○ | ○ |
| | ⑤-8 | 1.1 | | 62.0 | ○ | ⊙ | ⊙ | ○ |
| | ⑤-6 | 1.5 | admixture | 59.5 | ○ | ⊙ | ○ | ○ |
| | ⑤-7 | 1.5 | ⑤-25 | 60.0 | ○ | ⊙ | ○ | ○ |
| | ⑤-8 | 1.3 | | 60.5 | ○ | ⊙ | ⊙ | ○ |
| | ⑤-6 | 1.4 | admixture | 60.5 | ○ | ○ | Δ | Δ |
| | ⑤-7 | 1.5 | ⑤-26 | 62 | ○ | ○ | Δ | ○ |
| | ⑤-8 | 1.3 | | 61.5 | ○ | ○ | ○ | ○ |
| Comp. | ⑤-1 | 2.3 | comp. | 60.5 | Δ | Δ | x | x |
| | ⑤-2 | 2.5 | admixture | 62.0 | Δ | Δ | x | x |
| | ⑤-3 | 1.5 | ⑤-1 | 61.0 | Δ | Δ | x | x |
| | ⑤-1 | 1.9 | comp. | 60.0 | x | x | Δ | Δ |
| | ⑤-4 | 1.7 | admixture | 60.0 | x | x | x | Δ |
| | ⑤-5 | 1.5 | ⑤-2 | 64.5 | x | x | Δ | Δ |
| | ⑤-1 | 1.4 | comp. | 63.5 | x | x | Δ | Δ |
| | ⑤-7 | 1.2 | admixture | 61 | x | x | x | Δ |
| | ⑤-8 | 0.8 | ⑤-3 | 60.5 | x | x | Δ | ○ |
| | ⑤-6 | 1.8 | comp. | 62.5 | x | x | x | x |
| | ⑤-7 | 1.8 | admixture | 62.0 | x | x | x | x |
| | ⑤-8 | 1.5 | ⑤-4 | 63 | x | x | Δ | Δ |
| | ⑤-1 | 2.3 | comp. | 60.5 | x | x | x | x |
| | ⑤-2 | 2.5 | admixture | 59.0 | x | x | x | x |
| | ⑤-4 | 2 | ⑤-5 | 58.5 | x | x | x | x |
| | ⑤-8 | 0.6 | — | 62.5 | x | x | ○ | ○ |
| | — | — | — | 23.0 | immeasurable owing to poor mixing | | | |

*: % by weight based on cement

We claim:

1. A polysaccharide derivative prepared by replacing all or part of the hydroxyl hydrogen atoms of a polysaccharide or polysaccharide derivative with (A) a hydrophobic substituent having a $C_8$–$C_{43}$ hydrocarbon chain and (B) an ionic hydrophilic substituent having at least one member selected from the group consisting of sulfonic, carboxyl, phosphoric, and sulfate groups and salts thereof, wherein the average degree of replacement by the substituent (A) is 0.0001 or above but below 0.001 per monosaccharide unit as determined by Zeisel's method or the diazomethane method, and by the substituent (B) is 0.01 to 2.0 per monosaccharide unit as determined by colloidal titration.

2. The polysaccharide derivative according to claim 1, wherein the polysaccharide or polysaccharide derivative is one selected from the group consisting of cellulose, guar gum, starch, hydroxyethylcellulose, hydroxyethyl guar gum, hydroxyethylstarch, methylcellulose, methyl guar gum, methylstarch, ethylcellulose, ethyl guar gum, ethylstarch, hydroxypropylcellulose, hydroxypropyl guar gum, hydroxypropylstarch, hydroxyethylmethylcellulose, hydroxyethylmethyl guar gum, hydroxyethylmethylstarch, hydroxypropylmethylcellulose, hydroxypropylmethyl guar gum and hydroxypropylmethylstarch.

3. The polysaccharide derivative according to claim 1, wherein the substituent (A) is a $C_{10}$–$C_{43}$ linear or branched alkyl, alkenyl or acyl group which may be hydroxylated or interrupted by oxycarbonyl group (—COO— or —OCO—) or an ether linkage and the substituent (B) is an optionally hydroxylated $C_1$–$C_5$ sulfoalkyl group or a salt thereof.

4. The polysaccharide derivative according to claim 3, wherein the substituent (A) is at least one selected from the group consisting of $C_{12}$–$C_{36}$ linear and branched alkyl, alkenyl and acyl groups which may be hydroxylated or interrupted by an ether linkage, and the substituent (B) is at least one selected from the group consisting of 2-sulfoethyl, 3-sulfopropyl, 3-sulfo-2-hydroxypropyl and 2-sulfo-1-(hydroxymethyl)ethyl.

5. A hydraulic composition comprising a hydraulic material and 0.1 to 5% by weight based on the hydraulic material of a polysaccharide derivative prepared by replacing all or part of the hydroxyl hydrogen atoms of a polysaccharide or polysaccharide derivative with (A) a hydrophobic substituent having a $C_8$–$C_{43}$ hydrocarbon chain and (B) an ionic hydrophilic substituent having at least one member selected from the group consisting of sulfonic, carboxylic, phosphoric, and sulfate groups and salts thereof.

6. The hydraulic composition according to claim 5, wherein the substituent (A) is a $C_{10}$–$C_{43}$ linear or branched alkyl, alkenyl or acyl group which may be hydroxylated or interrupted by oxycarbonyl (—COO— or —OCO—) or an ether linkage; the substituent (B) is an optionally hydroxylated $C_1$–$C_5$ sulfoalkyl group or a salt thereof; the average degree of replacement by the substituent (A) is 0.0001 or above but below 0.001 per monosaccharide unit as determined by Zeisel's method or the diazomethane method; and that by the substituent (B) is 0.01 to 2.0 per monosaccharide unit as determined by colloidal titration.

7. The hydraulic composition according to claim 5, wherein the polysaccharide derivative is an alkylated or hydroxyalkylated polysaccharide; the hydrocarbon chain of (A) is a $C_{10}$–$C_{40}$ alkyl or alkenyl group; and the hydraulic material is cement.

8. The hydraulic composition according to claim 7, wherein the degree of replacement by the substituent (A) is 0.001 to 1 per monosaccharide unit as determined by NMR spectrometry; and that by the substituent (B) is 0.01 to 2 per monosaccharide unit as determined by colloidal titration.

9. The hydraulic composition according to claim 5, wherein the polysaccharide derivative is an alkylated or hydroxyalkylated polysaccharide; the hydrocarbon chain of the substituent (A) has 8 to 40 carbon atoms; the degree of replacement by the substituent (A) is 0.0001 to 1 per monosaccharide unit as determined by Zeisel's method or the diazomethane method; and that by the substituent (B) is 0.001 to 2 per monosaccharide unit as determined by colloidal titration.

10. The hydraulic composition according to claim 5, wherein the substituent (A) is at least one member selected from the group consisting of alkyl glyceryl ether groups wherein the alkyl group is a $C_8$–$C_{40}$ linear or branched alkyl, alkenyl glyceryl ether groups wherein the alkenyl group is a $C_8$–$C_{40}$ linear or branched alkyl, and $C_8$–$C_{40}$ linear and branched alkyl, alkenyl and acyl groups which may be hydroxylated or interruptedbyoxycarbonyl; and the substituent (B) is at least one member selected from the group consisting of sulfoalkyl, carboxyalkyl, alkyl phosphate and alkyl sulfate groups each of which has 1 to 5 carbon atoms and may be hydroxylated; and salts thereof.

11. The hydraulic composition according to claim 5, wherein the substituent (A) is an alkyl glyceryl ether group wherein the alkyl group is a $C_{12}$–$C_{36}$ linear alkyl.

12. The hydraulic composition according to claim 5, wherein the hydraulic material is an inorganic substance which can be hardened through hydration.

13. The hydraulic composition according to claim 5 or 9, wherein the hydraulic material is hemihydrate gypsum.

14. The hydraulic composition according to claim 5 or 9, wherein the hydraulic material is ordinary portland cement, blast-furnace slag cement or silica cement.

15. The hydraulic composition according to claim 5 or 9, which further comprises a super plasticizer in an amount of 0.0001 to 3% by weight, based on the weight of the hydraulic composition.

16. The hydraulic composition according to claim 15, wherein the super plasticizer is a (co)polymer prepared from one or two or more monomers selected from the group consisting of ethylenically unsaturated carboxylic acids, adducts thereof with alkylene oxides, and derivatives thereof, or a condensate of formaldehyde with one or two or more compounds selected from the group consisting of methylolated and sulfonated derivatives of naphthalene, melamine, phenol, urea and aniline.

17. The hydraulic composition according to claim 15, wherein the super plasticizer is a water-soluble vinyl copolymer comprising oxyalkylene units and prepared by copolymerizing a monomer represented by the following general formula (1) with at least one monomer selected from those represented by the following general formulae (2) or (3):

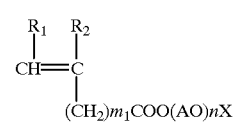

(1)

(wherein $R_1$ and $R_2$ are each hydrogen or methyl; $m_1$ is a number of 0 to 2; AO is $C_2$–$C_3$ oxyalkylene; n is a number of 2 to 300; and X is hydrogen or $C_1$–$C_3$ alkyl)

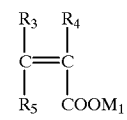

(2)

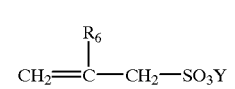

(3)

(wherein $R_3$, $R_4$ and $R_5$ are each hydrogen, methyl or $(CH_2)_{m2}COOM_2$; $R_6$ is hydrogen or methyl; $M_1$, $M_2$ and Y are each hydrogen, alkali metal, alkaline earth metal, ammonium, alkylammonium or substituted alkylammonium; and $m_2$ is a number of 0 to 2).

18. The hydraulic composition according to claim 15 wherein the super plasticizer is selected from the group consisting of condensates of formaldehyde with at least one selected from the group consisting of methylolated and sulfonated derivatives of naphthalene, melamine, phenol, urea and aniline.

19. The hydraulic composition according to claim 15, wherein the amount of superplasticizer is 0.001 to 0.5% by weight, based on the hydraulic material.

20. The hydraulic composition according to claim 5, wherein the amount of polysaccharide derivative is 0.001 to 5% by weight, based on the hydraulic material.

21. The hydraulic composition according to claim 19, wherein the amount of superplasticizer is 0.001 to 0.1% by weight, based on the hydraulic material.

22. The hydraulic composition according to claim 15, wherein the super plasticizer is comprised of condensates of formaldehyde with metal salts of naphthalenesulfonic acid, condensates of formaldehyde with metal salts of melaminesulfonic acid, condensates of formaldehyde with phenolsulfonic acid, or co-condensates of formaldehyde with phenol and sulfanilic acid.

23. The hydraulic composition according to claim 15, wherein the super plasticizer is comprised of a water-soluble vinyl copolymer comprising oxyalkylene units.

24. The hydraulic composition according to claim 15, wherein the super plasticizer is comprised of polymers and copolymers prepared from one or more monomers selected from the group consisting of ethylenically unsaturated carboxylic acids, adducts thereof with alkylene oxides, and derivatives thereof.

25. A method for preparing a hydraulic composition comprising:

mixing a polysaccharide derivative prepared by replacing all or part of the hydroxyl hydrogen atoms of a polysaccharide or polysaccharide derivative with (A) a hydrophobic substituent having a $C_8$–$C_{43}$ hydrocarbon chain and (B) an ionic hydrophilic substituent having at least one member selected from the group consisting of sulfonic, carboxylic, phosphoric, and sulfate groups and salts thereof with a hydraulic material and water.

* * * * *